United States Patent [19]

Matsumoto et al.

[11] Patent Number: 5,273,835
[45] Date of Patent: Dec. 28, 1993

[54] OVER-WRITE CAPABLE MAGNETOOPTICAL RECORDING MEDIUM

[75] Inventors: Hiroyuki Matsumoto; Jun Saito, both of Tokyo, Japan

[73] Assignee: Nikon Corporation, Tokyo, Japan

[21] Appl. No.: 586,874

[22] Filed: Sep. 21, 1990

[30] Foreign Application Priority Data

Sep. 25, 1989 [JP] Japan .................................. 1-248519
Oct. 27, 1989 [JP] Japan .................................. 1-280227
Nov. 30, 1989 [JP] Japan .................................. 1-310969

[51] Int. Cl.$^5$ .................................................. G11B 5/66
[52] U.S. Cl. .................................. 428/694 EC; 369/13; 428/900
[58] Field of Search ............... 428/694, 900; 369/13; 365/122; 360/59, 114; 430/945

[56] References Cited

U.S. PATENT DOCUMENTS 4,855,975 8/1989 Akasaka et al. ...................... 369/13

FOREIGN PATENT DOCUMENTS 258978 3/1988 European Pat. Off. .
0352548 1/1990 European Pat. Off. .

OTHER PUBLICATIONS

Patents Abstracts of Japan, vol. 13, No. 520 (P-963) Nov. 21, 1989 (Abstract only).
Patent Abstracts of Japan, vol. 13, No. 475 (P-950) Oct. 27, 1989 (Abstract only).
Patent Abstracts of Japan, vol. 12, No. 284 (P-740) (3131) Aug. 4, 1988 (Abstract only).
Swartz et al, "The Bell System Technical Journal," vol. 62 (1983), pp. 1923-1936.

Primary Examiner—P. C. Sluby
Assistant Examiner—R. Follett
Attorney, Agent, or Firm—Shapiro and Shapiro

[57] ABSTRACT

A magnetooptical recording medium capable of performing an over-write operation by only modulating an intensity of a light beam without modulating a direction of a bias field is known. This invention provides a multilayered medium which has an advantage of a large margin for an initial field Hini. for initializing the medium, and can stably perform an over-write operation, or which can increase a beam intensity in a reproduction mode to attain a high C/N ratio.

1 Claim, 20 Drawing Sheets

| FIRST LAYER | : RECORDING LAYER |
|---|---|
| SECOND LAYER | : REFERENCE LAYER |

| FIRST LAYER | ⇑⇓⇓⇑⇓⇑⇓⇓* |
|---|---|
| SECOND LAYER | ⇑⇑⇑⇑⇑⇑⇑⇑ |

(Tcomp.1 < TL)

(TL < Tcomp.1)

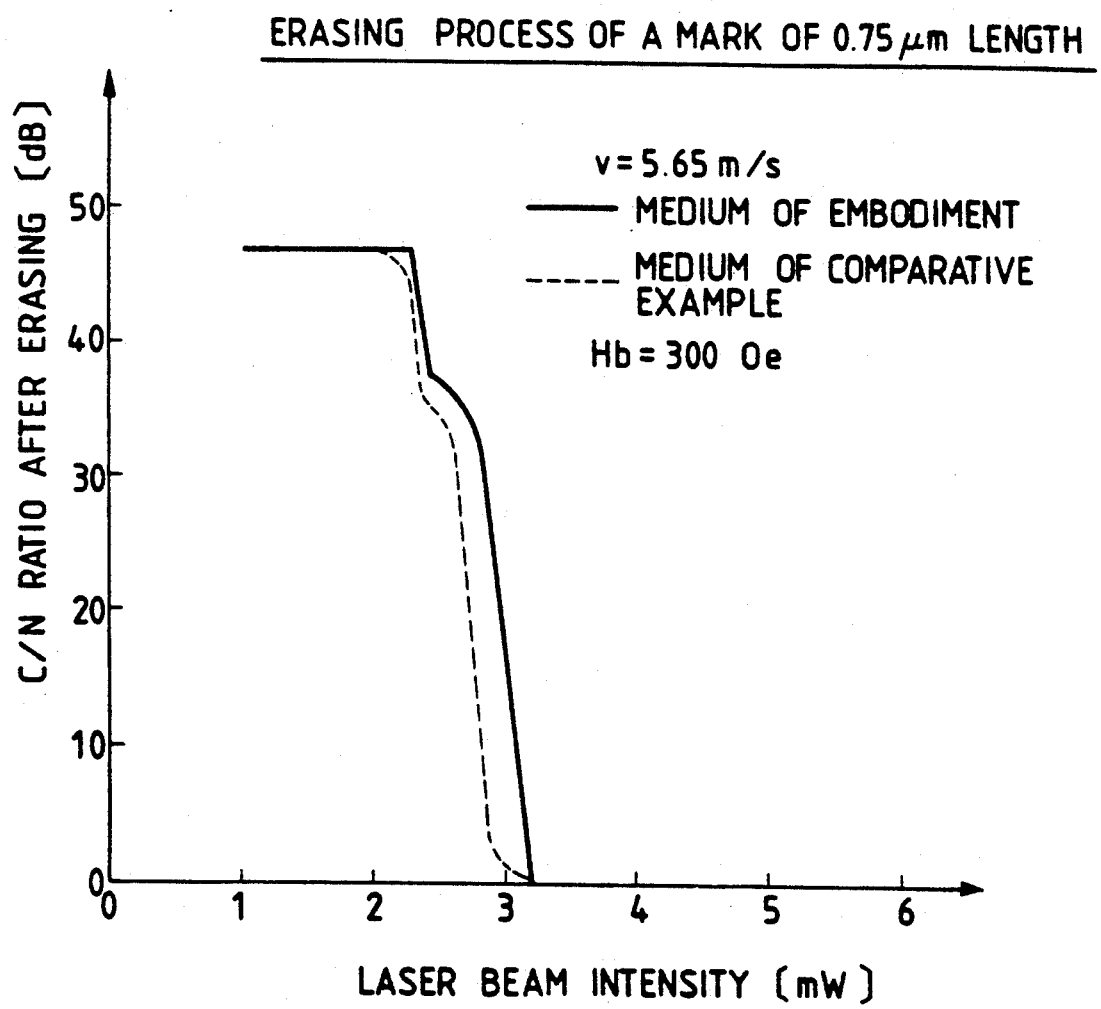

OVER-WRITE CAPABLE MAGNETOOPTICAL RECORDING MEDIUM

BACKGROUND OF THE INVENTION:

1. Field of the Invention

The present invention relates to a magnetooptical recording medium capable of performing an over-write operation by only modulating an intensity of a light beam without modulating a direction of a bias field Hb.

2. Related Background Art

In recent years, many efforts have been made to develop an optical recording/reproduction method which can satisfy various requirements including high density, large capacity, high access speed, and high recording-/reproduction speed, and a recording apparatus, a reproduction apparatus, and a recording medium used therefor.

Of various optical recording/reproduction methods, the magnetooptical reproduction method is most attractive due to its unique advantages in that information can be erased after it is recorded and new information can be repetitively recorded.

A recording medium used in the magnetooptical recording/reproduction method has a perpendicular magnetic layer or layers as a recording layer. The magnetic layer comprises, for example, amorphous GdFe GdCo, GdFeCo, TbFe, TbCo, TbFeCo, and the like. Concentrical or spiral tracks are normally formed on the recording layer, and information is recorded on the tracks. In this specification, one of the "upward" and "downward" directions of the magnetization with respect to a film surface is defined as an "A direction", and the other one is defined as a "non-A direction". Information to be recorded is binarized in advance, and is recorded by two signals, i.e., a bit ($B_1$) having "A-directed" magnetization, and a bit ($B_0$), and a bit having "non-A-directed" magnetization. These bits $B_1$ and $B_0$ correspond to "1" and "0" levels of a digital signal, respectively. However, in general, the direction of magnetization of the recording tracks can be aligned in the "non-A direction" by applying a strong bias field. This processing is called "initialization". Thereafter, a bit ($B_1$) having "A-directed" magnetization is formed on the tracks. Information is recorded in accordance with the presence/absence and/or a bit length of the bit ($B_1$).

PRINCIPLE OF BIT FORMATION

In formation of bits, feature of a laser, i.e., spatially and timewisely excellent coherence is advantageously utilized, and a beam can be focused as a spot as small as a diffraction limit determined by the wavelength of a laser beam. The focused light is radiated on a track surface to form a bit having a diameter of 1 μm or less in a recording layer, thereby recording information. In optical recording, a recording density up to $10^8$ bits/$cm^2$ can be theoretically attained because a laser beam can be concentrated to a spot having a diameter as small as its wavelength.

As shown in FIG. 1, in magnetooptical recording, a laser beam (L) is focused on a recording layer (1) to heat it. During this interval, a bias field (Hb) in a direction opposite to an initialized direction is externally applied to the heated portion. Thus, a coersivity Hc of the locally heated portion is decreased, and becomes smaller than the bias field (Hb). As a result, the direction of magnetization of this portion is aligned in the direction of the bias field (Hb). Thus, a bit magnetized in the opposite direction can be formed.

A ferromagnetic material and a ferrimagnetic material have different temperature dependencies of their directions of magnetization and Hc. The ferromagnetic material has Hc which is decreased near a Curie temperature, and recording is executed based on this phenomenon. Therefore, this recording is quoted as a Tc write (Curie temperature write) process.

On the other hand, the ferrimagnetic material has a compensation temperature lower than the Curie temperature, and at that temperature, magnetization (M) becomes zero. In contrast to this, Hc becomes very large near the compensation temperature, and when a temperature falls outside the compensation temperature, Hc is immediately decreased. The decreased Hc is defeated by a relatively weak bias field (Hb). In other words, recording is enabled. This recording process is called a $T_{comp.}$ write (compensation temperature write) process.

The recording temperature need not be the Curie temperature or a temperature near it, and a temperature near the compensation temperature. That is, if a bias field (Hb) capable of defeating the decreased Hc is applied to a material having the decreased Hc at a predetermined temperature higher than a room temperature, recording is enabled.

PRINCIPLE OF REPRODUCTION

FIG. 2 shows the principle of information reproduction on the basis of a magnetooptical effect. Light is an electromagnetic wave having an electromagnetic field vector which is normally diverged in all the directions on a plane perpendicular to an optical path. When light is converted into linearly polarized light ($L_P$) and is radiated on a recording layer (1), the light is reflected by the surface of the recording layer (1) or transmits through the recording layer (1). At this time, a plane of polarization is rotated according to the direction of magnetization (M). This rotating phenomenon is called a magnetic Kerr effect or a magnetic Faraday effect.

For example, if the plane of polarization of reflected light is rotated through $\theta k$ degrees with respect to "A-directed" magnetization, it is rotated through $-\theta k$ degrees with respect to "non-A-directed" magnetization. Therefore, when the axis of an optical analyzer is set to be perpendicular to a plane inclined at $-\theta k$ degrees, light reflected by a bit ($B_0$) magnetized in the "non-A direction" cannot pass through the analyzer. In contrast to this, of light reflected by a bit ($B_1$) magnetized in the "A direction", components multiplied with $(\sin 2\theta k)^2$ pass through the analyzer, and become incident on a detector (photoelectric conversion means). As a result, the bit ($B_1$) magnetized in the "A direction" looks brighter than the bit ($B_0$) magnetized in the "non-A direction", and causes the detector to generate a strong electrical signal. The electrical signal from the detector is modulated according to recorded information, and information can be reproduced.

In order to re-use a recorded medium, (i) the entire medium must be re-initialized at a time by an initializing device, (ii) an erase head as well as a recording head must be added to a recording apparatus, or (iii) recorded information must be erased using a recording apparatus or an erasing apparatus as preliminary processing.

Therefore, in a conventional magnetooptical recording method, it is impossible to perform an over-write operation capable of recording new information regardless of the presence/absence of recorded information.

If the direction of the bias field Hb can be desirably modulated between the "A direction" and the "non-A direction" as needed, an over-write operation is possible. However, it is impossible to modulate the direction of the bias field Hb at high speed. For example, when the bias field Hb is generated by a permanent magnet, the direction of the magnet must be mechanically reversed. However, it is impossible to reverse the direction of the magnet at high speed. When the bias field Hb is generated by an electromagnet, it is also impossible to modulate the direction of a large-capacity current at high speed.

However, along with the progress of techniques, a magnetooptical recording method capable of an over-write operation by modulating only an intensity of a light beam to be radiated according to binary or two-valued information to be recorded without turning on/-off the bias field Hb or modulating the direction of the bias field Hb, an over-write capable magnetooptical recording medium used in this method, and an over-write capable recording apparatus used in this method have been invented, and were filed as a patent application (Japanese Laid-Open Patent Application No. 62-175948). This invention will be quoted as a "basic invention" hereinafter. The over-write principle will be described below based on this basic invention. [Principle of Over-write Operation]

One characteristic feature of an over-write operation according to the basic invention is to use a magnetooptical recording medium comprising a multilayered perpendicular magnetic film having at least a two-layered structure of a recording layer (first layer) and a reference layer (second layer). Information is recorded in the first layer (also in the second layer in some cases) by a bit having "A-directed" magnetization, and a bit having "non-A-directed" magnetization.

An over-write operation according to the basic invention comprises:

(a) moving a recording medium;

(b) aligning the direction of magnetization of only the second layer in the "A direction" immediately before recording while the direction of magnetization of the first layer is left unchanged;

(c) radiating a laser beam onto the medium;

(d) pulse-modulating an intensity of the beam according to two-valued information to be recorded;

(e) applying a bias field to a portion irradiated with the beam; and (f) forming one of the bit having "A-directed" magnetization and a bit having "non-A-directed" magnetization when the intensity of the pulse beam is at high level, and forming the other bit when the beam intensity is at low level.

According to the basic invention, when information is to be recorded, an over-write capable magnetooptical recording apparatus comprising, e.g., the following means is used:

(a) means for moving a magnetooptical recording medium;

(b) initial field Hini. apply means;

(c) a laser beam source;

(d) modulating means for pulse-modulating a beam intensity between (1) high level for giving, to the medium, an appropriate temperature for forming one of a bit having "A-directed" magnetization, and a bit having "non-A-directed" magnetization, and (2) low level for giving, to the medium, an appropriate temperature for forming the other bit; and (e) bias field apply means which may be commonly used as the initial field apply means.

In the over-write method of the basic invention, a laser beam is pulse-modulated according to information to be recorded. However, this procedure itself has been performed in the conventional magnetooptical recording method, and a means for pulse-modulating the beam intensity on the basis of two-valued information to be recorded is a known means. For example, see "THE BELL SYSTEM TECHNICAL JOURNAL, Vol. 62 (1983), pp. 1923-1936. Therefore, if required high and low levels of a beam intensity are given, such a means can be obtained by partially modifying the conventional modulating means. Such modulation is easy for those who are skilled in the art if high and low levels of a beam intensity are given.

Another characteristic feature of the basic invention lies in high and low levels of the beam intensity. More specifically, when the beam intensity is at high level, "A-directed" magnetization of the reference layer (second layer) is reversed to the "non-A direction" by the bias field Hb, and a bit having "non-A-directed" [or "A-directed"] magnetization is formed in the recording layer (first layer) by the "non-A-directed" magnetization of the second layer. When the beam intensity is at low level, a bit having "A-directed" [or "non-A-directed"] magnetization is formed in the first layer by the "A-directed" magnetization of the second layer.

If expressions ooo [or ΔΔΔ] appear, ooo outside the parentheses in the first expression corresponds to ooo in the subsequent expressions ooo [or ΔΔΔ], and vice versa.

As is well known, even if recording is not performed, a laser beam is often turned on at very low level * in order to, for example, access a predetermined recording position on the medium. When the laser beam is also used for reproduction, the laser beam is often turned on at an intensity of the very low level *. In the present invention, the intensity of the laser beam may be set at this very low level *. However, low level for forming a bit is higher than the very low level *. Therefore, the output waveform of the laser beam in the basic invention is as shown in FIG. 3A.

Although not described in the specification of the basic invention, in the basic invention, a recording beam may adopt not a single beam but two proximity beams, so that the leading beam is used as a low-level laser beam (erasing beam) which is not modulated, and the trailing beam is used as a high-level laser beam (write beam) which is modulated according to information. In this case, the trailing beam is pulse-modulated between high level and basis level (equal to or lower than low level, and its output may be zero). The output waveform in this case is as shown in FIG. 3B.

An over-write capable medium is roughly classified into a first or second category. In either category, the recording medium has a multilayered structure including a recording layer (first layer) and a reference layer (second layer), as shown in FIG. 4A.

The first layer is the recording layer, which exhibits a high coercivity at room temperature and has a low reversing temperature. The second layer is the reference layer, which exhibits a relatively low coercivity at room temperature and a higher reversing temperature as compared to the first layer. Each of the first and second layers may comprise a multilayered film. If necessary, a third layer may be interposed between the first and second layers. In addition, a clear boundary need not be formed between the first and second layers, and one layer may gradually transit to the other layer.

In the first category, when the coersivity of the recording layer (first layer) is represented by $H_{C1}$; that of the reference layer (second layer), $H_{C2}$; a Curie temperature of the first layer, $T_{C1}$; that of the second layer, $T_{C2}$; a room temperature, $T_R$; a medium temperature obtained when a low-level laser beam is radiated, $T_L$; that obtained when a high-level laser beam is radiated, $T_H$; a coupling field applied to the first layer, $H_{D1}$; and a coupling field applied to the second layer, $H_{D2}$, a recording medium satisfies Formula 1 below, and satisfies Formulas 2 to 5 at the room temperature:

$T_R < T_{C1} \approx T_L < T_{C2} \approx T_H$       Formula 1

$H_{C1} > H_{C2} + |H_{D1} \mp H_{D2}|$       Formula 2

$H_{C1} > H_{D1}$       Formula 3

$H_{C2} > H_{D2}$       Formula 4

$H_{C2} + H_{D2} < |H_{ini.}| < H_{C1} \pm H_{D1}$       Formula 5

In the above formulas, symbol "$\approx$" means "equal to" or "substantially equal to". In addition, of double signs ± and ∓, the upper sign corresponds to an A (antiparallel) type medium, and the lower sign corresponds to a P (parallel) type medium (these media will be described later). Note that a ferromagnetic medium belongs to a P type.

The relationship between a coersivity and a temperature is as shown in the graph of FIG. 5. A thin curve represents the characteristics of the first layer, and a bold curve represents those of the second layer.

Therefore, when an initial field (Hini.) is applied to this recording medium at the room temperature, the direction of magnetization of only the reference layer (second layer) is reversed without reversing that of the recording layer (first layer) according to Formula 5. When the initial field (Hini.) is applied to the medium before recording, the second layer can be magnetized in the "A direction (in the drawings, the "A direction" is indicated by an upward arrow ↑, and the "non-A direction" is indicated by a downward arrow ↓). If the initial field Hini. becomes zero, the direction of the magnetization ↑ of the second layer can be left unchanged without being re-reversed according to Formula 4.

FIG. 4B schematically shows a state wherein only the reference layer is magnetized in the "A direction" ↑ immediately before recording.

In FIG. 4B, the direction of magnetization * in the first layer represents previously recorded information. In the following description, since the direction of magnetization in the first layer does not change the basic operation mechanism, it is indicated by X (Condition 1 in FIGS. 6 and 7). A change in direction of magnetization of a medium when high- and low-level laser beams are radiated on the medium will be described below with reference to FIGS. 6 and 7.

A case will be described below wherein a high-level laser beam is radiated on the medium in Condition 1 in FIG. 6 to increase a medium temperature to $T_H$. In this case, since $T_H$ is higher than the Curie temperature $T_{C1}$, the magnetization of the recording layer (first layer) disappears. In addition, since $T_H$ is near the Curie temperature $T_{C2}$, the magnetization of the reference layer (second layer) also disappears completely or almost completely. The bias field (Hb) in the "A direction" or "non-A direction" is applied to the medium in accordance with a type of medium. The bias field (Hb) can be a stray field from the medium itself. For the sake of simplicity, assume that the bias field (Hb) in the "non-A direction" is applied to the medium. Since the medium is moving, a given irradiated portion is immediately away from the laser beam, and is cooled. When the medium temperature is decreased under the presence of Hb, the direction of magnetization of the second layer is reversed to the "non-A direction" based on Hb (Condition $2_H$ in FIG. 6).

When the medium is further cooled and the medium temperature is decreased slightly below $T_{C1}$, magnetization of the first layer appears again. In this case, the direction of magnetization of the first layer is influenced by that of the second layer due to a magnetic coupling (exchange coupling) force. As a result, magnetization ↓ (the P type medium) or ↑ (the A type medium) is formed according to the type of medium (Condition $3_H$ in FIG. 6).

A change in condition caused by the high-level laser beam is called a high-temperature cycle herein.

A case will be described below wherein a low-level laser beam is radiated on a medium in Condition 1 in FIG. 7 to increase a medium temperature to $T_L$. In this case, since $T_L$ is near the Curie temperature $T_{C1}$, the magnetization of the first layer disappears completely or almost completely. However, since $T_L$ is lower than the Curie temperature $T_{C2}$, the magnetization of the second layer does not disappear (Condition $2_L$ in FIG. 7).

In this case, although the bias field (Hb) is unnecessary, it cannot be turned on or off at high speed. Therefore, the bias field (Hb) in the high-temperature cycle is left applied inevitably.

However, since the $H_{C2}$ is kept high, the magnetization of the second layer will not be reversed by Hb. Since the medium is moving, a given irradiation portion is immediately away from the laser beam, and is cooled. As cooling progresses, the magnetization of the first layer appears again. The direction of magnetization appearing in this case is influenced by that of the second layer due to the magnetic coupling force. As a result, ↑ (P type) or ↓ (A type) magnetization appears according to the type of medium. This magnetization is left unchanged at the room temperature (Condition $3_L$ in FIG. 7).

A change in condition caused by the low-level laser beam is called a low-temperature cycle herein.

As described above, bits having either one of the directions of magnetization ↑ and ↓ which are opposite to each other are formed in the high- and low-temperature cycles regardless of the direction of magnetization of the first layer before recording. More specifically, an over-write operation is enabled by pulse-modulating the laser beam between high level (high-temperature cycle) and low level (low-temperature cycle) in accordance with information to be recorded. FIG. 8 summarizes the over-write operation described above in units of P and A type media.

In the above description, a magnetic composition which has no compensation temperature $T_{comp.}$ between the room temperature and the Curie temperature in both the first and second layers has been exemplified. However, when the compensation temperature $T_{comp.}$ is present, if the medium temperature exceeds the compensation temperature, (1) the direction of magnetization is reversed, and (2) a medium type (A or P type) is reversed. For these two reasons, a description will be complicated. The bias field Hb also has a direction ↓ opposite to that described above at the room temperature.

Note that the recording medium normally has a disk shape, and is rotated during recording. For this reason, a recorded portion (bit) is influenced again by the initial field Hini. during one revolution. As a result, the direction of magnetization of the reference layer (second layer) is aligned in the original "A direction" ↑. However, at the room temperature, the magnetization of the second layer can no longer influence that of the recording layer (first layer), and the recorded information can be held.

If linearly polarized light is radiated on the first layer, since light reflected thereby includes information, the information can be reproduced as in the conventional magnetooptical recording medium. Note that depending on a composition design of the first and second layers, a method of transferring information in the first layer to the second layer aligned in the original "A direction" ↑ upon application of a reproduction field $H_R$ before reproduction, or a medium in which information in the first layer is naturally transferred to the second layer as soon as the influence of Hini. disappears without applying the reproduction field $H_R$, is known. In this case, information may be reproduced from the second layer.

A perpendicular magnetic film constituting each of the recording layer (first layer) and the reference layer (second layer) is selected from the group consisting of (1) ferromagnetic and ferrimagnetic materials having no compensation temperature and having a Curie temperature, and (2) an amorphous or crystalline ferrimagnetic material having both the compensation temperature and the Curie temperature.

The first category utilizing the Curie temperature as a magnetization reversing temperature has been described. In contrast to this, the second category utilizes a decreased Hc at a predetermined temperature higher than the room temperature. In the second category, substantially the same description as in the first category can be applied except that a temperature $T_{S1}$ at which the recording layer (first layer) is magnetically coupled to the reference layer (second layer) is used in place of $T_{C1}$ in the first category, and a temperature $T_{S2}$ at which the second layer is reversed by Hb is used in place of $T_{C2}$.

In the second category, when the coersivity of the first layer is represented by $H_{C1}$; that of the second layer, $H_{C2}$; a temperature at which the first layer is magnetically coupled to the second layer, $T_{S1}$; a temperature at which the magnetization of the second layer is reversed by Hb, $T_{S2}$; a room temperature, $T_R$; a medium temperature obtained when a low-level laser beam is radiated, $T_L$; that obtained when a high-level laser beam is radiated, $T_H$; a coupling field applied to the first layer, $H_{D1}$; and a coupling field applied to the second layer, $H_{D2}$, a medium of the second category satisfies Formula 6 below, and satisfies Formulas 7 to 10 at the room temperature:

$$T_R < R_{S1} \approx T_L < T_{S2} \approx T_H \quad \text{Formula 6}$$

$$H_{C1} > H_{C2} + |H_{D1} \mp H_{D2}| \quad \text{Formula 7}$$

$$H_{C1} > H_{D1} \quad \text{Formula 8}$$

$$H_{C2} > H_{D2} \quad \text{Formula 9}$$

$$H_{C2} + H_{D2} < |H_{ini.}| < H_{C1} \pm H_{D1} \quad \text{Formula 10}$$

In the above formulas, symbol "$\approx$" means "equal to" or "substantially equal to". In addition, of double signs ± and ∓, the upper sign corresponds to an A (antiparallel) type medium, and the lower sign corresponds to a P (parallel) type medium.

In the second category, in the high-temperature process (high temperature $T_H$), the magnetization of the second layer does not disappear but is sufficiently weak. The magnetization of the first layer disappears or is sufficiently weak. Even when sufficiently weak magnetization is left in both the first and second layers, the bias field Hb ↓ is sufficiently large, and causes the direction of magnetization of the second layer and that of the first layer in some cases to follow the direction of Hb ↓ (Condition $2_H$ in FIG. 9).

(1) Immediately thereafter, or (2) when cooling progresses since laser beam radiation is stopped and the medium temperature is decreased below $T_H$, or (3) when the irradiated portion is away from Hb, the second layer influences the first layer via an exchange coupling force (magnetic wall energy) $\sigma_W$ to cause the direction of magnetization of the first layer to follow a stable direction. As a result, Condition $3_H$ in FIG. 9 is established. When the magnetization of the first layer is originally in a stable direction, it is left unchanged.

On the other hand, in a low-temperature process (low temperature $T_L$), magnetization of both the first and second layer does not disappear. However, the magnetization of the first layer is sufficiently weak (Condition $2_L$ in FIG. 10).

Therefore, the direction of magnetization of the first layer is influenced by the magnetization of the second layer larger than that of Hb through $\sigma_W$. In this case, since the second layer has sufficient magnetization, its magnetization will not be reversed by Hb. As a result, Condition $3_L$ in FIG. 10 is established even if Hb ↓ is present.

In the above description, a magnetic composition which has no compensation temperature $T_{comp.}$ between the room temperature and the Curie temperature in both the first and second layers has been exemplified. However, when the compensation temperature $T_{comp.}$ is present, if the medium temperature exceeds the compensation temperature, (1) the direction of magnetization is reversed, and (2) a medium type (A or P type) is reversed. For these two reasons, a description will be complicated. The bias field Hb also has a direction opposite to that described above at the room temperature.

Although not described in the specification of the basic invention, an initial field Hini. apply means may be replaced with a third magnetic layer (perpendicular magnetic film) which is in tight contact with the second layer, so that the second layer of the medium of the present invention may be initialized by an exchange coupling force σ applied from the third layer.

In both the first and second categories, the recording medium is preferably constituted by the recording layer (first layer) and the reference layer (second layer) each of which comprises an amorphous ferrimagnetic material selected from transition metal (e.g., Fe, Co)—heavy rare earth metal (e.g., Gd, Tb, Dy, and the like) alloy compositions.

When the materials of both the first and second layers are selected from the transition metal-heavy rare earth metal alloy compositions, the direction and level of magnetization appearing outside the alloy are determined by the relationship between the direction and level of spin of transition metal atoms (to be abbreviated to as TM hereinafter), and those of heavy rare earth metal atoms (to be abbreviated to as RE hereinafter) inside the alloy. For example, the direction and level of TM spin are represented by a dotted vector $\dotuparrow$, those of RE spin are represented by a solid vector $\uparrow$, and the direction and level of magnetization of the entire alloy are represented by a double-solid vector $\Uparrow$. In this case, the vector $\Uparrow$ is expressed as a sum of the vectors $\dotuparrow$ and $\uparrow$. However, in the alloy, the vectors $\dotuparrow$ and $\uparrow$ are directed in the opposite directions due to the mutual effect of the TM spin and the RE spin. Therefore, when these vectors are equal to each other, the sum of $\dotdownarrow$ and $\uparrow$ or the sum of $\downarrow$ and $\dotuparrow$ is zero (i.e., the level of magnetization appearing outside the alloy becomes zero). The alloy composition making the sum of vectors zero is called a compensation composition. When the alloy has another composition, it has a strength equal to a difference between the strengths of the two spins, and has a vector ($\uparrow$ or $\downarrow$) having a direction equal to that of the larger vector. Magnetization of this vector appears outside the alloy. For example, $\uparrow\dotdownarrow$ appears as $\uparrow$, and $\dotuparrow\downarrow$ appears as $\downarrow$.

When one of the strengths of the vectors of the RE and TM spins is larger than the other, the alloy composition is referred to as "oo rich" named after the larger spin name (e.g., RE rich).

Both the first and second layers can be classified into TM rich and RE rich compositions. Therefore, as shown in FIG. 11, when the composition of the first layer is plotted along the ordinate and that of the second layer is plotted along the abscissa, the types of medium as a whole of the basic invention can be classified into the following four quadrants. The P type medium described above belongs to Quadrants I and III, and the A type medium belongs to Quadrants II and IV. In FIG. 11, the intersection of the abscissa and the ordinate represents the compensation composition of the two layers.

In view of a change in coersivity against a change in temperature, a given alloy composition has characteristics wherein the coersivity temporarily increases infinitely and then abruptly decreases before a temperature reaches the Curie temperature (at which the coersivity is zero). The temperature corresponding to the infinite coersivity is called a compensation temperature ($T_{comp.}$). No compensation temperature is present between the room temperature and the Curie temperature in the TM rich alloy composition. The compensation temperature below the room temperature is nonsense in the magnetooptical recording, and hence, it is assumed in this specification that the compensation temperature is present between the room temperature and the Curie temperature.

If the first and second layers are classified in view of the presence/absence of the compensation temperature, the recording media can be classified into four types. A medium in Quadrant I includes all the four types of media. FIGS. 12A to 12D show "graphs of the relationship between the coersivity and temperature" for the four types of media. Note that thin curves represent characteristics of the first layer, and bold curves represent those of the second layer.

When the recording layer (first layer) and the reference layer (second layer) are classified in view of their RE or TM rich characteristics and in view of the presence/absence of the compensation temperature, recording media can be classified into the following nine classes.

TABLE 1

| Quadrant I (P type) | | | |
|---|---|---|---|
| Class | First Layer: RE Rich | Second Layer: RE Rich | Type |
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |

| Quadrant II (A type) | | | |
|---|---|---|---|
| Class | First Layer: RE Rich | Second Layer: TM Rich | Type |
| 5 | $T_{comp.}$ | No $T_{comp.}$ | 3 |
| 6 | No $T_{comp.}$ | No $T_{comp.}$ | 4 |

| Quadrant III (P type) | | | |
|---|---|---|---|
| Class | First Layer: TM Rich | Second Layer: TM Rich | Type |
| 7 | No $T_{comp.}$ | No $T_{comp.}$ | 4 |

| Quadrant IV (A type) | | | |
|---|---|---|---|
| Class | First Layer: TM Rich | Second Layer: RE Rich | Type |
| 8 | No $T_{comp.}$ | $T_{comp.}$ | 2 |
| 9 | No $T_{comp.}$ | No $T_{comp.}$ | 4 |

The over-write principle will be described in detail below with reference a specific medium No. 1-1 belonging to a recording medium of Class 1 (P type, Quadrant I, Type 1) shown in Table 1.

The medium No. 1-1 has a relation given by Formula 11:

$$T_R < T_{comp.1} < T_{C1} \approx T_L \approx T_{comp.2} < T_{C2} \approx T_H \qquad \text{Formula 11}$$

FIG. 13 shows this relation as a graph. Note that thin curves represent characteristics of the first layer, and bold curves represent those of the second layer.

A condition that reverses only the direction of magnetization of the second layer without reversing that of the first layer by the initial field Hini. at the room temperature $T_R$ is represented by Formula 12. This medium No. 1-1 satisfies Formula 12:

$$H_{C1} > H_{C2} + \frac{\sigma_w}{2M_{S1}t_1} + \frac{\sigma_w}{2M_{S2}t_2} \qquad \text{Formula 12}$$

where $H_{C1}$: coersivity of first layer
$H_{C2}$: coersivity of second layer
$M_{S1}$: saturation magnetization of first layer
$M_{S2}$: saturation magnetization of second layer
$t_1$: film thickness of first layer
$t_2$: film thickness of second layer
$\sigma_w$: interface wall energy At this time, a condition for the field Hini. is represented by Formula 15. If the field Hini. disappears, the reversed magnetization of the second layer is influenced by the magnetization of the first layer due to the exchange coupling force. The conditions for holding the direction of magnetization of the second layer without being re-reversed are represented by Formulas 13 and 14. The medium No. 1-1 satisfies Formulas 13 and 14:

$$H_{C1} > \frac{\sigma_w}{2M_{S1}t_1} \quad \text{Formula 13}$$

$$H_{C2} > \frac{\sigma_w}{2M_{S2}t_2} \quad \text{Formula 14}$$

$$H_{C2} + \frac{\sigma_w}{2M_{S2}t_2} < |H_{ini.}| < H_{C1} - \frac{\sigma_w}{2M_{S1}t_1} \quad \text{Formula 15}$$

The direction of magnetization of the second layer of the recording medium which satisfies the condition given by Formulas 12 to 14 at the room temperature is aligned in, e.g., "A direction" ↑ ( ↑⁑ ) by Hini. which satisfies the condition given by Formula 15 immediately before recording. At this time, the first layer is left in the recorded state (Condition 1 in FIGS. 14 and 15). This Condition 1 is held immediately before recording. In this case, the bias field (Hb) is applied in a direction of ↑.

A high-temperature cycle will be described below with reference to FIG. 14.

HIGH-TEMPERATURE CYCLE

When a high-level laser beam is radiated to increase a medium temperature to $T_L$, since $T_L$ is almost equal to the Curie temperature $T_{C1}$ of the first layer, its magnetization disappears (Condition $2_H$ in FIG. 14).

When beam radiation further continues, the medium temperature is further increased. When the medium temperature slightly exceeds $T_{comp.2}$ of the second layer, the relationship between strengths of RE and TM spins is reversed ( ↑⁑ → ↑⁑ ) although their directions are left unchanged. For this reason, the direction of magnetization of the second layer is reversed to the "non-A direction" ↓ (Condition $3_H$ in FIG. 12).

Since $H_{C2}$ is still high at this temperature, the direction of magnetization of the second layer will not be reversed by ↑ Hb. When the temperature is further increased and reaches $T_H$, the temperature of the second layer becomes almost equal to the Curie temperature $T_{C2}$, and its magnetization also disappears (Condition $4_H$ in FIG. 14).

In Condition $4_H$, when an irradiated portion falls outside the spot region of the laser beam, the temperature of the medium begins to decrease. When the medium temperature decreases slightly below $T_{C2}$, magnetization appears in the second layer. In this case, magnetization ↑ ( ↓⁑ ) appears by ↑ Hb (Condition $5_H$ in FIG. 14). However, since the temperature is yet higher than $T_{C1}$, no magnetization appears in the first layer.

When the temperature of the medium is further decreased below $T_{comp.2}$, the relationship between the strengths of the RE and TM spins is reversed ( ↓⁑ → ↓⁑ ) although their directions remain the same. As a result, the direction of magnetization of the alloy as a whole is reversed from ↑ to the "non-A direction" ↓ (Condition $6_H$ in FIG. 14).

In Condition $6_H$, since the temperature of the medium is higher than $T_{C1}$, the magnetization of the first layer is kept disappearing. In addition, since $H_{C2}$ at that temperature is higher, the direction of magnetization ↓ of the second layer will not be reversed by ↑ Hb.

When the temperature of the medium is further decreased slightly below $T_{C1}$, magnetization appears in the first layer. At this time, the exchange coupling force from the second layer acts to align each of RE spins ( ↓ ) and TM spins ( ↑ ). Since the temperature of the first layer is equal to or higher than $T_{comp.1}$, the TM spin is larger than the RE spin, and hence, magnetization ↓⁑, i e., ↑ appears in the first layer. This condition corresponds to Condition $7_H$ (Condition $7_H$ in FIG. 14).

When the temperature of the medium is further decreased from the temperature in Condition $7_H$ and is below $T_{comp.1}$, the relationship between the strengths of the RE and TM spins of the first layer is reversed (↓⁑ → ↓⁑). As a result, magnetization ↓ appears (Condition $8_H$ in FIG. 14).

The temperature of the medium is then decreased from the temperature in Condition $8_H$ to the room temperature. Since $H_{C1}$ at the room temperature is sufficiently high, the magnetization of the first layer will not be reversed by ↑ Hb, and Condition $8_H$ is held. In this manner, bit formation in the "non-A direction" is completed.

A low-temperature cycle will be described below with reference to FIG. 15.

LOW-TEMPERATURE CYCLE

A low-level laser beam is radiated to increase a temperature of the to $T_L$. Thus, since $T_L$ is almost equal to the Curie temperature $T_{C1}$ of the first layer, its magnetization disappears (Condition $2_L$ in FIG. 15).

In Condition $2_L$, when an irradiated portion falls outside the spot region of the laser beam, the temperature of the medium begins to decrease. When the temperature of the medium is decreased slightly below $T_{C1}$, the RE and TM spins ( ↑⁑ ) of the second layer influence those of the first layer due to the exchange coupling force. More specifically, a force to align each of the RE spins ( ↑ ) and the TM spins ( ↓ ). As a result, magnetization ↑⁑, i.e., ↓ appears in the first layer to overcome the bias field ↑ Hb (Condition $3_L$ in FIG. 15). Since the temperature in this state is equal to or higher than $T_{comp.1}$, the TM spin is larger than the RE spin.

When the temperature of the medium is further decreased below $T_{comp.1}$, the relationship between the strengths of RE and TM spins of the first layer is reversed ( ↑⁑ → ↑⁑ ) like in the high-temperature cycle. As a result, the of magnetization of the first layer becomes ↑ (Condition $4_L$ in FIG. 15).

Condition $4_L$ is maintained even if the medium temperature is decreased to the room temperature. As a result, bit formation in the "A direction" ↑ is completed.

The over-write principle will be described in detail below with reference to a medium No. 1-2 belonging to a recording medium of Class 1 (P type, Quadrant I, Type 1) shown in Table 1.

This medium No. 1-2 has relations given by Formulas 11-2 and 11-3:

$$R_R < T_{comp.1} < T_L < T_H \leq T_{C1} \leq T_{C2} \quad \text{Formula 11-2}$$

$$T_{comp.2} < T_{C1} \quad \text{Formula 11-3}$$

For the sake of simplicity, the medium is assumed to satisfy a relation given by $T_H < T_{C1} < T_{C2}$ in the following description. $T_{comp.2}$ may be higher than, equal to, or lower than $T_L$. For the sake of simplicity, $T_L < T_{comp.2}$ in the following description. FIG. 16 shows the above relations as a graph. Note that thin curves represent the characteristics of the first layer, and bold curves represent those of the second layer.

A condition that reverses only the direction of magnetization of the second layer without reversing the direction of magnetization of the first layer (recording layer) by the initial field Hini. at the room temperature $T_R$ is represented by Formula 12. This medium No. 1-2 satisfies Formula 12:

$$H_{C1} > H_{C2} + \frac{\sigma_w}{2M_{S1}t_1} + \frac{\sigma_w}{2M_{S2}t_2} \quad \text{Formula 12}$$

where
$H_{C1}$: coersivity of first layer
$H_{C2}$: coersivity of second layer
$M_{S1}$: saturation magnetization of first layer
$M_{S2}$: saturation magnetization of second layer
$t_1$: film thickness of first layer
$t_2$: film thickness of second layer
$\sigma_w$: interface wall energy At this time, a condition for the field Hini. is represented by Formula 15. If the field Hini. disappears, the directions of magnetization of the first and second layers are influenced to each other due to the exchange coupling force. The conditions for holding the directions of magnetization of the first and second layers without being reversed are represented by Formulas 13 and 14. The medium No. 1-2 satisfies Formulas 13 and 14:

$$H_{C1} > \frac{\sigma_w}{2M_{S1}t_1} \quad \text{Formula 13}$$

$$H_{C2} > \frac{\sigma_w}{2M_{S2}t_2} \quad \text{Formula 14}$$

The direction of magnetization of the second layer of the recording medium which satisfies the conditions given by Formulas 12 to 14 at the room temperature is aligned in, e.g., "A direction" ↑ (↑↓) by Hini. which satisfies the condition given by Formula 15 immediately before recording:

$$H_{C2} + \frac{\sigma_w}{2M_{S2}t_2} < |Hini.| < H_{C1} - \frac{\sigma_w}{2M_{S1}t_1} \quad \text{Formula 15}$$

At this time, the first layer is left in the previous recorded state (Condition 1a or 1b in FIGS. 17 and 18). Note that in the following drawings, a bold partition between the first and second layers indicates a magnetic wall. Condition 1a or 1b is maintained immediately before recording.

In this case, the bias field Hb is applied in the "A direction" ↑.

Note that it is difficult to focus the bias field Hb to the same range as a radiation region (spot region) of the laser beam as well as normal magnetic fields. When a medium has a disk shape, recorded information (bit) is influenced by the field Hini. during one revolution, and Condition 1a or 1b appears again. The bit passes a portion near the laser beam radiation region (spot region). At this time, the bit in Condition 1a or 1b is influenced by a bias field Hb apply means since the bit approaches it. In this case, if the direction of magnetization of the first layer of the bit in Condition 1a having the direction of magnetization opposite to that of Hb is reversed by Hb, information which has been recorded one revolution before is lost. A condition for preventing this is given by:

$$H_{C1} > Hb + \frac{\sigma_w}{2M_{S1}t_1} \quad \text{Formula 15-2}$$

The disk-like medium must satisfy this formula at the room temperature. In other words, a condition for determining Hb is expressed by Formula 15-2.

The bit in Condition 1a or 1b then reaches the spot region of the laser beam. The laser beam intensity includes two levels, i.e., high and low levels.

A low-temperature cycle will be described below with reference to FIG. 17.

LOW-TEMPERATURE CYCLE

A low-level laser beam is radiated, and a medium temperature is increased beyond $T_{comp.1}$. Thus, the medium type is shifted from P type to A type. Although the directions of the RE and TM spins of the first layer are left unchanged, the relationship between their strengths is reversed. As a result, the direction of magnetization of the first layer is reversed (Condition 1a→Condition $2_{La}$, Condition 1b→Condition $2_{Lb}$ in FIG. 17).

The laser beam is kept radiated, and the medium temperature then reaches $T_L$. Thus, a relation given by the following formula is established:

$$H_{C1} + Hb < \frac{\sigma_w}{2M_{S1}t_1}$$

Even if Hb ↑ is present, Condition $2_{La}$ transits to Condition $3_L$. Meanwhile, since Condition $2_{Lb}$ remains the same regardless of Hb ↑, it becomes the same Condition $3_L$ (FIG. 17).

In this state, when the bit falls outside the spot region of the laser beam, the medium temperature begins to be decreased. When the medium temperature is decreased below $T_{comp.1}$, the medium type is restored from A type to original P type. The relationship between the strengths of the RE and TM spins of the first layer is reversed (↑↓ → ↑↓). As a result, the direction of magnetization of the first layer is reversed to the "A direction" ↑ (Condition $4_L$ in FIG. 17).

Condition $4_L$ is maintained even when the medium temperature is decreased to the room temperature.

As a result, a pit in the "A direction" ↑ is formed in the first layer.

The high-temperature cycle will be described below with reference to FIG. 18.

HIGH-TEMPERATURE CYCLE

When a high-level laser beam is radiated, the medium temperature is increased to the low temperature $T_L$ via $T_{comp.1}$. As a result, the same Condition $2_H$ as Condition $3_L$ is established (FIG. 18).

Upon radiation of the high-level laser beam, the medium temperature is further increased. When the medium temperature exceeds $T_{comp.2}$ of the second layer, the medium type is shifted from A type to P type. Although the directions of the RE and TM spins of the second layer are left unchanged, the relationship between their strengths is reversed (↑↓ → ↑↓). For this reason, the direction of magnetization of the second layer is reversed, i.e., the "non-A-directed ↓ magnetization is attained (Condition $3_H$ in FIG. 18).

However, since $H_{C2}$ is still high at this temperature, the magnetization of the second layer will not be reversed by ↑ Hb. when the medium temperature is further increased and reaches $T_H$, the coersivities of the first and second layers are decreased since $T_H$ is near the Curie temperature. As a result, the medium satisfies one of the following formulas:

$$|H_{C1} - H_{C2}| < \frac{\sigma_w}{2M_{S1}t_1} + \frac{\sigma_w}{2M_{S2}t_2} \quad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \quad (2)$$

and $$Hb > H_{C2} - \frac{\sigma_w}{2M_{S2}t_2}$$

$$Hb > H_{C1} - \frac{\sigma_w}{2M_{S1}t_1} \quad (3)$$

and $$Hb > H_{C2} + \frac{\sigma_w}{2M_{S2}t_2}$$

For this reason, the directions of magnetization of the two layers are reversed at almost the same time, and follow the direction of Hb. This condition corresponds to Condition $4_H$ in FIG. 18.

When the bit falls outside the spot region of the laser beam in this condition, the medium temperature begins to fall. When the medium temperature is decreased below $T_{comp.2}$, the medium type is shifted from P type to A type. Although the directions of the RE and TM spins of the second layer are left unchanged, the relationship between their strengths is reversed ($\downarrow^\uparrow_\uparrow \rightarrow \downarrow^\uparrow_\uparrow$). As a result, the direction of magnetization of the second layer is reversed from ↑ to the "non-A direction" ↓ (Condition $5_H$ in FIG. 18).

When the medium temperature is further decreased from the temperature in Condition $5_H$ below $T_{comp.1}$, the medium type is restored from A type to original P type. The relationship between their strengths is then reversed ($\downarrow^\uparrow_\uparrow \rightarrow \downarrow^\uparrow_\uparrow$). As a result, the direction of magnetization of the first layer is reversed to the "non-A direction" ↓ (Condition $6_H$ in FIG. 18).

The medium temperature is then decreased from the temperature in Condition $6_H$ to the room temperature. Since $H_{C1}$ at the room temperature is sufficiently high (Formula 15-3), the magnetization ↓ of the first layer will not be reversed by ↑ Hb, and Condition $6_H$ is maintained.

$$Hb < H_{C1} + \frac{\sigma_w}{2M_{S1}t_1} \quad \text{Formula 15-3}$$

In this manner, a bit in the "non-A direction" ↓ is formed in the first layer.

SUMMARY OF THE INVENTION

The medium of the basic invention has the first problem that bit formation in the low-temperature cycle cannot often be satisfactorily performed.

In particular, when the saturation magnetization $M_{S1}$ of the first layer is too large as compared to the exchange coupling force (equal to interface wall energy) $\sigma_w$ near the low temperature $T_L$ or when the bias field Hb is too high, the magnetization of the first layer is largely influenced by the bias field Hb. As a result, the direction of magnetization of the first layer cannot be stabilized with respect to the second layer, and a desired bit cannot be formed, thus posing the first problem.

The present inventors selected a composition of the first layer having a compensation temperature $T_{comp.1}$ equal to or higher than a room temperature in order to decrease the saturation magnetization $M_{S1}$ of the first layer.

However, the initial field Hini. becomes too high in turn, and it is difficult to find a proper small magnet, thus posing the second problem. In order to also suppress Hini., the present inventors selected a composition of the second layer having a compensation temperature $T_{comp.2}$ equal to or higher than the room temperature.

In other words, the present inventors selected a medium of Class 1 of the basic invention.

In this case, however, since the third problem is posed, that is, a range of the initial field Hini., i.e., a margin is narrowed, it is difficult to select proper Hini. As a result, initialization cannot be satisfactorily performed, and if possible, the direction of magnetization of the first layer is undesirably reversed and information tends to be erased.

On the other hand, a medium disclosed in detail in the specification of the basic invention poses the fourth problem, i.e., a narrow range of the bias field Hb, i.e., a narrow margin, and also poses the following fifth problem. That is, if formation of a mark (bit in the basic invention is currently called "mark") in a low-temperature cycle is called "erasing", a difference (Pce−Prs) between a laser beam intensity (power) Pce at which information can be completely erased and a laser beam intensity Prs at which erasing undesirably starts during reproduction is large. For this reason, a strong beam cannot be radiated in a reproduction mode, and hence, a C/N ratio is low.

It is, therefore, an object of the first aspect of the present invention to be described below to provide an over-write capable magnetooptical recording medium which can simultaneously solve the first, second, and third problems.

The second aspect of the present invention has an object to provide an over-write capable magnetooptical recording medium which can solve the fourth and fifth problems.

The first aspect of the present invention will now be described briefly.

In a magnetooptical recording medium constituted by stacking first and second layers, coersivities $H_C$ of the first and second layers apparently become $H_C^*$ given by the following Formulas 101 and 102 under the mutual influence due to an exchange coupling force $\sigma_w$:

$$H_{C1}^* = H_{C1} - \frac{\sigma_w}{2M_{S1}t_1} \quad \text{Formula 101}$$

$$H_{C2}^* = H_{C2} + \frac{\sigma_w}{2M_{S2}t_2} \quad \text{Formula 102}$$

Therefore, a difference between $H_{C1}^*$ and $H_{C2}^*$ becomes small unless $M_S$, the film thickness t, $\sigma_w$, and $H_C$ of each layer are appropriately set. However, it is difficult to find out a material or composition having a commercially practical film thickness and a large difference between $H_{C1}*$ and $H_{C2}*$ from existing magnetic materials or compositions, and commercially available magnetic materials or compositions inevitably have a small difference between $H_{C1}*$ and $H_{C2}*$.

The initial field Hini. must satisfy the following formula to align only the direction of magnetization of the second layer without reversing that of the first layer:

$$H_{C2} < Hini. < H_{C1}* \qquad \text{Formula 103}$$

Therefore, in the status quo, that is, since a difference between $H_{C1}*$ and $H_{C2}*$ is small, initialization cannot be satisfactorily performed, and if possible, the direction of magnetization of the first layer is undesirably reversed and information tends to be erased, thus posing the third problem.

Thus, the present inventors have made extensive studies to aim at solving the first and second problems by selecting a medium of Class 1 from the basic invention, and at solving the third problem by increasing a difference between $H_{C1}*$ and $H_{C2}*$, i.e., a margin of Hini., thus achieving the first aspect of the present invention.

Therefore, according to the first aspect of the present invention, there is provided a "magnetooptical recording medium capable of performing an over-write operation in such a manner that if the medium has a multilayered structure in which a first layer having perpendicular magnetic anisotropy serves as a recording layer and a second layer having magnetic anisotropy serves as a reference layer, and if one of upward and downward directions with respect to a layer plane is defined as an "A direction", and the other is defined as a "non-A direction", only a direction of magnetization of the second layer is aligned in the "A direction" by an initial field Hini. immediately before recording while a direction of magnetization of the first layer is left unchanged, (1) upon radiation of a high-level laser beam and application of a bias field Hb, when radiation of the laser beam is stopped and a temperature of the medium is decreased to a room temperature, a bit having "non-A-directed" magnetization in the second layer and "non-A-directed" magnetization in the first layer is formed, and (2) upon radiation of a low-level laser beam, when radiation of the laser beam is stopped and the temperature of the medium is decreased to the room temperature, a bit having "A-directed" magnetization in the second layer and "A-directed" magnetization in the first layer is formed even if the bias field Hb is present, wherein each of the first and second layers comprises an amorphous thin film of a transition metal-heavy rare earth alloy which is heavy rare earth rich and has a compensation temperature between the room temperature and a Curie temperature, and a third layer which comprises an amorphous thin film of a transition metal-heavy rare earth alloy having no compensation temperature between the room temperature and the Curie temperature is interposed between the first and second layers".

The operation of this medium will be described below. A medium according to the first aspect of the present invention belongs to Class 1 (P Type). Therefore, after a high-temperature process, if the direction of Hini. and the direction of the bias field Hb are assumed to be the "A direction ↑", a condition of a bit corresponds to Condition (a) in FIG. 19.

In this condition, when the bit receives the initial field Hini. in the "A direction ↑" again, the direction of magnetization of the second layer is reversed, and the bit has Condition (b) in FIG. 19.

At this time, it must be prevented that the direction of magnetization of the first layer is aligned in the "A direction" ↑ by Hini. ↑ to set Condition (c) or (d) in FIG. 19. If such a condition is established, this means that recorded information is lost.

Whether Condition (c) or (d) is established is determined by following conditions if an exchange coupling force between the first and third layers is represented by $\sigma_{w1}$ and an exchange coupling force between the third and second layers is represented by $\sigma_{w2}$:

That is, when the following relations are satisfied, Condition (c) is established; otherwise, Condition (d) is established:

$$M_{S1}t_1 > M_{S3}t_3$$

and $$\frac{\alpha}{\beta} - \frac{\sigma_{w2}}{2\beta_{S2}t_2} < H_{C1} + \frac{\sigma_{w1}}{2M_{S1}t_1}$$

(for $\alpha = M_{S1}t_1 H_{C1} + M_{S3}t_3 H_{C3}$, $\beta = M_{S1}t_1 - M_{S3}t_3$)

Therefore, a condition for Hini. for enabling Condition (b) but disabling Condition (c) is represented by Formula 104:

$$H_{C2} + \frac{\sigma_{w2}}{2M_{S2}t_2} < |Hini.| < \frac{\alpha}{\beta} - \frac{\sigma_{w2}}{2\beta} < H_{C1} + \frac{\sigma_{w1}}{2M_{S1}t_1} \qquad \text{Formula 104}$$

(for $\alpha = M_{S1}t_1 H_{C1} + M_{S3}t_3 H_{C3}$, $\beta = M_{S1}t_1 - M_{S3}t_3$)

A condition for Hini. for enabling Condition (b) but disabling Condition (d) is represented by Formula 105:

$$H_{C2} + \frac{\sigma_{w2}}{2M_{S2}t_2} < |Hini.| < H_{C1} + \frac{\sigma_{w1}}{2M_{S1}t_1} < \frac{\alpha}{\beta} - \frac{\sigma_{w2}}{2\beta} \qquad \text{Formula 105}$$

As can be seen from comparison between Formulas 104 and 103, the exchange coupling force $\sigma_w$ acting between the first and second layers and $\sigma_{w1}$ and $\sigma_{w2}$ are almost equal to each other, Formula 104 can assure a larger margin of Hini. than Formula 103.

As can be seen from comparison between Formulas 105 and 103, Formula 105 can assure a larger margin of Hini. than Formula 103.

Thus, the third problem can be solved.

More specifically, the medium according to the first aspect of the present invention satisfies:

$$T_R < T_{C1} \approx T_L < T_{C2} \approx T_H \text{ or} \qquad (1)$$

$$T_R < T_L \leq T_{C1} < T_H \leq T_{C2} \text{ or}$$

$$T_R < T_L < T_H \leq T_{C1} \leq T_{C2} \text{ or}$$

$$T_R < T_L < T_H \leq T_{C2} \leq T_{C1}$$

and satisfies the following formulas (2) to (5) at the room temperature:

$$H_{C1} > H_{C2} - \frac{\sigma_w}{2M_{S1}t_1} + \frac{\sigma_w}{2M_{S2}t_2} \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_{w2}}{2M_{S2}t_2} < |H_{ini.}| < \frac{\alpha}{\beta} - \frac{\sigma_{w2}}{2\beta} < H_{C1} + \frac{\sigma_{w1}}{2M_{S1}t_1} \quad (5)$$

(for $\alpha = M_{S1}t_1 H_{C1} + M_{S3}t_3 H_{C3}$, $\beta = M_{S1}t_1 - M_{S3}t_3$)

or $$H_{C2} + \frac{\sigma_{w2}}{2M_{S2}t_2} < |H_{ini.}| < H_{C1} + \frac{\sigma_{w1}}{2M_{S1}t_1} < \frac{\alpha}{\beta} - \frac{\sigma_{w2}}{2\beta} \quad (5)$$

where
- $T_R$: room temperature
- $T_{comp.1}$: compensation temperature of first layer
- $T_{C1}$: Curie temperature of first layer
- $T_{C1}$: Curie temperature of second layer
- $T_L$: temperature of recording medium upon radiation of low-level laser beam
- $T_H$: temperature of recording medium upon radiation of high-level laser beam
- $H_{C1}$: coersivity of first layer
- $H_{C2}$: coersivity of second layer
- $H_{C3}$: coersivity of third layer
- $M_{S1}$: saturation magnetization of first layer
- $M_{S2}$: saturation magnetization of second layer
- $M_{S3}$: saturation magnetization of third layer
- $t_1$: film thickness of first layer
- $t_2$: film thickness of second layer
- $t_3$: film thickness of third layer
- $\sigma_{w1}$: exchange coupling force acting between first and third layers
- $\sigma_{w2}$: exchange coupling force acting between third and second layers
- Hini.: initial field The first layer of the medium according to the first aspect of the present invention preferably comprises an alloy represented by the following formula:

$$RE_x TM_{1-x}$$

(where
RE represents at least one of Gd, Tb, Dy, and Ho,
TM represents at least one of Fe, Co, and Ni, and
x represents an atomic ratio, and its value is selected from a range of 0.2 to 0.3 (exclusive))

The second layer of the medium according to the first aspect of the present invention preferably comprises an alloy represented by the following formula:

$$RE_y TM_{1-y}$$

(where
RE represents at least one of Gd, Tb, Dy, and Ho,
TM represents at least one of Fe, Co, and Ni, and
y represents an atomic ratio, and its value is selected from a range of 0.2 to 0.35 (exclusive))

The third layer of the medium according to the first aspect of the present invention preferably comprises an alloy represented by the following formula:

$$RE_z TM_{1-z}$$

(where
RE represents at least one of Gd, Tb, Dy, and Ho,
TM represents at least one of Fe, Co, and Ni, and
z represents an atomic ratio, and its value is selected from a range of 0.15 to 0.25 (exclusive))

Furthermore, in the medium according to the first aspect of the present invention, the first layer preferably has a lower compensation temperature than that of the second layer and, in particular, an absolute value of the compensation temperature is preferably 150° C. or less.

In the medium according to the first aspect of the present invention, the Curie temperature $T_{C1}$ of the first layer is preferably higher than the compensation temperature $T_{comp.2}$ of the second layer.

In the medium according to the first aspect of the present invention, the Curie temperature $T_{C1}$ of the first layer is preferably lower than the Curie temperature $T_{C2}$ of the second layer.

In the medium according to the first aspect of the present invention described above, a low-temperature cycle can be stably executed (solution of the first problem), the initial field Hini. can be relatively low (solution of the second problem), and a margin of Hini. can be increased, so that initialization can be stably executed, and information recorded in the first layer can be prevented from being erased (solution of the third problem).

The second aspect of the present invention which can solve the above-mentioned fourth and fifth problems will now be described briefly.

According to the second aspect of the present invention, there is provided a "magnetooptical recording medium in which at least a first layer (recording layer) and a second layer (reference layer) are stacked, a direction of magnetization of the second layer is aligned in one of upward and downward directions immediately before recording without reversing a direction of magnetization of the first layer, and a light beam is modulated according to information without modulating a bias field to allow an over-write operation, wherein the first layer has a compensation temperature $T_{comp.1}$ between a room temperature and a Curie temperature $T_{C1}$, and $\eta$ defined as follows is not less than 200 (unit: Oe/° C.), preferably, not less than 1,000, and more preferably, not less than 4,000 at a temperature $T_L$ at which a low-temperature process occurs".

where
$$E_1 = 2 \cdot M_{S1} \cdot H_{C1} \cdot t_1 \quad \text{(unit: erg/cm}^2\text{)}$$

$M_{S1}$: saturation magnetization (Gauss) of first layer (recording layer)
$H_{C1}$: coersivity (Oe) of first layer
$t_1$: film thickness (cm) of first layer
$\sigma_w$ is the magnetic wall energy (erg/cm$^2$) which is generated or disappears upon reversal of the direction of magnetization of the first layer (recording layer).

$$H_{C1}^* = H_{C1}\left(1 - \frac{\sigma_w}{E_1}\right)$$

$$\eta = \frac{d}{dT}|H_{C1}^*|$$

-continued (T is the medium temperature)

A medium according to the second aspect of the present invention is not limited to an over-write capable medium of the basic invention, but may be a magnetooptical recording medium in which at least a first layer (recording layer) and a second layer (reference layer) are stacked, a direction of magnetization of the second layer is aligned in one of upward and downward directions immediately before recording without reversing a direction of magnetization of the first layer, and a light beam is modulated according to information without modulating a bias field to allow an over-write operation. When a magnetic layer defined according to the second aspect of the present invention is used as the first layer, the effect can be obtained.

This is because temperature characteristics (temperature change) of $H_{C1}^*$ near $T_L$ of the medium having the above-mentioned $\eta$ are sharp, as shown in FIG. 29 or 30 (Hb in these drawings is the bias field to be applied to a recording portion), and can provide clear distinction of whether or not a low-temperature process is possible against various fluctuations, e.g., a fluctuation of magnetic characteristics of a material, a fluctuation of a film thickness, a fluctuation of a thermal conductivity, and the like.

Since $\eta$ is large and a range of Hb which can have an intersection with $H_{C1}^*$ is wide, a margin of Hb can be increased. Meanwhile, since a fluctuation of $T_L$ can be decreased with respect to various fluctuations, Pce−Prs can be decreased.

Therefore, according to the second aspect of the present invention, (1) a margin of the bias field Hb can be increased, and a degree of freedom of composition design of a recording medium can be increased, and (2) a laser beam having a high intensity can be used in a reproduction mode, thus obtaining a high C/N ratio.

In the medium according to the second aspect of the present invention, the medium temperature $T_L$ causing a low-temperature cycle is close to or coincides with a compensation temperature $T_{comp.1}$ of the first layer within a range of ±15° C. (preferably, ±10° C., and, more preferably, ±5° C.). In the following description, "$\approx$" in $T_{comp.1} \approx T_L$ has the above-mentioned meaning.

The over-write principle will be described in detail below with reference to a medium No. 1-3 which belongs to a recording medium of Class 1 (P type, Quadrant I, Type 1) shown in Table 1.

This medium No. 1-3 has relations given by Formulas 111 and 111-2:

$$R_R < T_{comp.1} \approx T_L < T_{C1} < T_H \leq T_{C2} \qquad \text{Formula 111}$$

$$T_{comp.2} < T_{C1} \qquad \text{Formula 111-2}$$

FIG. 20 shows the above relations as a graph. Note that thin curves represent characteristics of the first layer, and bold curves represent characteristics of the second layer.

A condition that reverses only the direction of magnetization of the second layer without reversing that of the first layer by the initial field Hini. at the room temperature $T_R$ is represented by Formula 112. This medium No. 1-3 satisfies Formula 112:

$$H_{C1} > H_{C2} + \frac{\sigma_w}{2M_{S1}t_1} + \frac{\sigma_w}{2M_{S2}t_2} \qquad \text{Formula 112}$$

where
$H_{C1}$: coersivity of first layer
$H_{C2}$: coersivity of second layer
$M_{S1}$: saturation magnetization of first layer
$M_{S2}$: saturation magnetization of second layer
$t_1$: film thickness of first layer
$t_2$: film thickness of second layer
$\sigma_w$: interface wall energy At this time, a condition for the field Hini. is represented by Formula 115. If the field Hini. disappears, the directions of magnetization of the first and second layers are influenced to each other due to the exchange coupling force. The conditions for holding the directions of magnetization of the first and second layers without being reversed are represented by Formulas 113 and 114. The medium No. 1-3 satisfies Formulas 113 and 114:

$$H_{C1} > \frac{\sigma_w}{2M_{S1}t_1} \qquad \text{Formula 113}$$

$$H_{C2} > \frac{\sigma_w}{2M_{S2}t_2} \qquad \text{Formula 114}$$

The direction of magnetization of the second layer of the recording medium which satisfies the conditions given by Formulas 112 to 114 at the room temperature is aligned in, e.g., "A direction" ↑ ( ↑ ↓ ) by Hini. which satisfies the condition given by Formula 115 immediately before recording:

$$H_{C2} + \frac{\sigma_w}{2M_{S2}t_2} < |H_{ini.}| < H_{C1} - \frac{\sigma_w}{2M_{S1}t_1} \qquad \text{Formula 115}$$

At this time, the first layer is left in the previous recorded state (Condition 1a or 1b in FIGS. 21 and 22). Condition 1a or 1b is maintained immediately before recording.

In this case, the bias field Hb is applied in the "A direction" ↑.

Note that it is difficult to focus the bias field Hb to the same range as a radiation region (spot region) of the laser beam as well as normal magnetic fields. When a medium has a disk shape, recorded information (mark) is influenced by the field Hini. during one revolution, and Condition 1a or 1b appears again. The mark passes the next track neighboring the laser beam radiation region (spot region). At this time, the mark in Condition 1a or 1b is influenced by the bias field Hb. In this case, if the direction of magnetization of the first layer of the mark in Condition 1a having the direction of magnetization opposite to that of Hb is reversed by Hb, data which has been recorded one revolution before is lost. A condition for preventing this is given by:

$$H_{C1} > Hb + \frac{\sigma_w}{2M_{S1}t_1} \qquad \text{Formula 115-2}$$

The disk-like medium must satisfy this formula at the room temperature. In other words, a condition for determining Hb is expressed by Formula 115-2.

The mark in Condition 1a or 1b then reaches the spot region of the laser beam. The laser beam intensity includes two levels, i.e., high and low levels like in the basic invention.

A low-temperature cycle will be described below with reference to FIG. 21.

LOW-TEMPERATURE CYCLE

Upon radiation of a low-level laser beam, a medium temperature reaches $T_L$. Thus the following relation is established:

$$\sigma_w > E_1 \pm 2M_{S1} \cdot Hb \cdot t_1$$

(where if Hini is assumed to be positive, ± is "+" when $T_{comp.1} < T_L$, and is "−" when $T_{comp.1} > T_L$)

Under the presence of Hb ↓, (1) in Condition 1a wi magnetic wall, the direction of magnetization of the first layer is reversed, and the magnetic wall disappears, or (2) Condition 1b without a magnetic wall is maintained.

When the mark falls outside the spot region of the laser beam in this state, the medium temperature begins to decrease, and Condition $2_L$ in FIG. 21 is established, thus completing formation of a mark in the "A direction" ↑.

The high-temperature cycle will be described below with reference to FIG. 22.

HIGH-TEMPERATURE CYCLE

Upon radiation of a high-level laser beam, the medium temperature is increased beyond $T_{comp.1} \approx T_L$. As a result, Condition $2_H$ in FIG. 22 is established.

Upon radiation of the high-level laser beam, the medium temperature is further increased. When the medium temperature becomes slightly higher than $T_{comp.2}$ of the second layer, the relationship between the strengths of RE and TM spins is reversed ( ↑⃗ → ↑⃗ ) although their directions are left unchanged. For this reason, the direction of magnetization of the second layer is reversed to the "non-A direction" ↓ (Condition $3_H$ in FIG. 22).

However, since $H_{C2}$ is still high at this temperature, the magnetization of the second layer will not be reversed by ↑ Hb. When the medium temperature is further increased and reaches $T_{C1}$, magnetization of the first layer disappears (Condition $4_H$ in FIG. 22).

When the medium temperature is further increased and reaches $T_H$, the temperature of the second layer is close to the Curie temperature $T_{C2}$, and $H_{C2}$ is decreased. Therefore, the direction of magnetization of the second layer is reversed by ↑ Hb (Condition $5_H$ in FIG. 22). In Condition $5_H$, when the mark falls outside the spot region of the laser beam, the medium temperature begins to fall.

When the medium temperature is decreased slightly below $T_{C1}$, magnetization appears in the first layer. At this time, an interface wall energy from the second layer acts to align each of RE spins ( ↓ ) and TM spins ( ). Since the temperature of the first layer is equal to or higher than $T_{comp.1}$, the TM spin is larger than RE spin. For this reason, magnetization ↓⃗, i.e., ↑ appears in the first layer. This condition corresponds to Condition $6_H$ in FIG. 22.

When the medium temperature is decreased below $T_{comp.2}$, the relationship between the strengths of RE and TM spins is reversed ( ↓⃗ → ↓⃗ ) although their directions are left unchanged. As a result, the direction of magnetization of the alloy as a whole is reversed from ↑ to the "non-A direction" ↓ (Condition $7_H$ in FIG. 22).

When the medium temperature is further decreased from the temperature in Condition $7_H$ below $T_{comp.1}$, the relationship between the strengths of RE and TM spins is reversed ( ↓⃗ → ↓⃗ ). As a result, magnetization ↓ appears (Condition $8_H$ in FIG. 22).

The medium temperature is then decreased from the temperature in Condition $8_H$ to the room temperature. Since $H_{C1}$ at the room temperature is sufficiently high (Formula 115-3), the magnetization ↓ of the first layer will not be reversed by ↑ Hb, and Condition $8_H$ is maintained.

$$Hb < H_{C1} + \frac{\sigma_w}{2M_{S1}t_1} \qquad \text{Formula 115-3}$$

In this manner, formation of a mark in the "non-A direction" ↓ is completed.

The over-write principle will be described in detail below with reference to a medium No. 3 which belongs to a recording medium of Class 3 (P type, Quadrant I, Type 3) shown in Table 1.

This medium No. 3 has relations given by Formula 121:

$$T_R < T_{comp.1} \approx T_L < T_{C1} < T_{C2} \approx T_H \qquad \text{Formula 121}$$

FIG. 23 shows this relation as a graph.

A condition that reverses only the direction of magnetization of the second layer without reversing that of the first layer by the initial field Hini. at the room temperature $T_R$ is represented by Formula 122. This medium No. 3 satisfies Formula 122:

$$H_{C1} > H_{C2} + \frac{\sigma_w}{2M_{S1}t_1} + \frac{\sigma_w}{2M_{S2}t_2} \qquad \text{Formula 122}$$

At this time, a condition for Hini. is represented by Formula 125:

$$H_{C2} + \frac{\sigma_w}{2M_{S2}t_2} < |Hini.| < H_{C1} - \frac{\sigma_w}{2M_{S1}t_1} \qquad \text{Formula 125}$$

If the field Hini. disappears, the directions of magnetization of the first and second layers are influenced to each other due to the exchange coupling force. The conditions for holding the directions of magnetization of the first and second layers without being reversed are represented by Formulas 123 and 124. The medium No. 3 satisfies Formulas 123 and 124:

$$H_{C1} > \frac{\sigma_w}{2M_{S1}t_1} \qquad \text{Formula 123}$$

$$H_{C2} > \frac{\sigma_w}{2M_{S2}t_2} \qquad \text{Formula 124}$$

The direction of magnetization of the second layer of the recording medium which satisfies the conditions given by Formulas 122 to 124 at the room temperature is aligned in, e.g., "A direction" ↑ ( ↑⃗ ) by Hini. which satisfies the condition given by Formula 125 immediately before recording. At this time, the first layer is left in the previous recorded state (Condition 1a or 1b in FIGS. 24 and 25). Condition 1a or 1b is maintained immediately before recording.

In this case, the bias field (Hb) is applied in a direction of ↓.

Note that it is difficult to focus the bias field Hb to the same range as a radiation region (spot region) of the laser beam as well as normal magnetic fields. When a medium has a disk shape, recorded information (mark) is influenced by the field Hini. during one revolution, and Condition 1a or 1b appears again. The mark passes the next track neighboring the laser beam radiation region (spot region). At this time, the mark in Condition 1a or 1b is influenced by the bias field Hb. In this case, if the direction of magnetization of the first layer of the mark in Condition 1a having the direction of magnetization opposite to that of Hb is reversed by Hb, data which has been recorded one revolution before is lost. A condition for preventing this is given by Formula 125-2:

$$H_{C1} > Hb + \frac{\sigma_w}{2M_{S1}t_1} \quad \text{Formula 125-2}$$

The medium No. 3 satisfies this formula at the room temperature.

The mark in Condition 1a or 1b then reaches the spot region of the laser beam. The laser beam intensity includes two levels, i.e., high and low levels like in the basic invention.

A low-temperature cycle will be described below with reference to FIG. 24.

LOW-TEMPERATURE CYCLE

Upon radiation of a low-level laser beam, a medium temperature reaches $T_L$. Thus the following relation is established:

$$\sigma_w > E_1 \pm 2M_{S1} \cdot Hb \cdot t_1$$

(where if Hini is assumed to be positive, $\pm$ is "+"0 when $T_{comp.1} < T_L$, and is "−" when $T_{comp.1} > T_L$)

Under the presence of Hb $\downarrow$, (1) in Condition 1a with a magnetic wall, the direction of magnetization of the first layer is reversed, and the magnetic wall disappears, or (2) Condition 1b without a magnetic wall is maintained.

When the mark falls outside the spot region of the laser beam in this state, the medium temperature begins to decrease, and Condition $2_L$ in FIG. 24 is established, thus completing formation of a mark in the "A direction" $\uparrow$.

The high-temperature cycle will be described below with reference to FIG. 25.

HIGH-TEMPERATURE CYCLE

When a high-level laser beam is radiated to increase a medium temperature to $T_{C1}$, its magnetization disappears (Condition $2_H$ in FIG. 25).

When beam radiation further continues and the medium temperature reaches $T_H$, since $T_H$ is almost equal to $T_{C2}$ of the second layer, magnetization of the second layer also disappears almost completely (Condition $3_H$ in FIG. 25).

When the mark falls outside the spot region of the laser beam in Condition $3_H$, the medium temperature begins to decrease. When the medium temperature is decreased slightly below $T_{C2}$, magnetization appears in the second layer. In this case, magnetization $\downarrow$ ($\downarrow^\uparrow$) appears by $\downarrow$ Hb. However, since the temperature is still higher than $T_{C1}$, no magnetization appears in the first layer. This condition corresponds to Condition $4_H$ in FIG. 25.

When the medium temperature is decreased slightly below $T_{C1}$, magnetization also appears in the first layer. In this case, the magnetization of the second layer influences that of the first layer due to the exchange coupling force. As a result, a force for aligning each of RE spins ($\downarrow$) and TM spins ($\uparrow$) acts. In this case, since the medium temperature is yet equal to or higher than $T_{comp.1}$, the TM spin is larger than RE spin ($\downarrow^\uparrow$). As a result, magnetization appears in the second layer (Condition $5_H$ in FIG. 25).

When the medium temperature is further decreased from the temperature in Condition $5_H$ and becomes below $T_{comp.1}$, the relationship between the strengths of TM and RE spins is reversed ($\downarrow^\uparrow \rightarrow \downarrow^\uparrow$). For this reason, the direction of magnetization of the first layer is reversed to the "non-A direction $\downarrow$ (Condition $6_H$ in FIG. 25).

The medium temperature is then decreased from the temperature in Condition $6_H$ to the room temperature. Since $H_{C1}$ at the room temperature is sufficiently large, the magnetization of the first layer is stably maintained. In this manner, formation of a mark in the "non-A direction" is completed.

The over-write principle will be described in detail below with reference to a medium No. 5 which belongs to a recording medium of Class 5 (A type, Quadrant II, Type 3) shown in Table 1.

This medium No. 5 has relations given by Formula 131:

$$T_R < T_{comp.1} \approx T_L < T_H \leq T_{C1} \leq T_{C2} \quad \text{Formula 131}$$

For the sake of simplicity, $T_H < T_{C1} < T_{C2}$ in the following description. FIG. 26 shows this relation as a graph.

A condition that reverses only the direction of magnetization of the second layer without reversing that of the first layer by the initial field Hini. at the room temperature $T_R$ is represented by Formula 132. This medium No. 5 satisfies Formula 132:

$$H_{C1} > H_{C2} + \left| \frac{\sigma_w}{2M_{S1}t_1} - \frac{\sigma_w}{2M_{S2}t_2} \right| \quad \text{Formula 132}$$

At this time, a condition for Hini. is represented by Formula 135. If Hini. disappears, the directions of magnetization of the first and second layers are influenced to each other due to the exchange coupling force. The conditions for holding the directions of magnetization of the first and second layers without being reversed are represented by Formulas 133 and 134. The medium No. 5 satisfies Formulas 133 and 134:

$$H_{C1} > \frac{\sigma_w}{2M_{S1}t_1} \quad \text{Formula 133}$$

$$H_{C2} > \frac{\sigma_w}{2M_{S2}t_2} \quad \text{Formula 134}$$

The direction of magnetization of the second layer of the recording medium which satisfies the conditions given by Formulas 132 to 134 at the room temperature is aligned in, e.g., "A direction" $\uparrow$ ($\downarrow^\uparrow$) by Hini. which satisfies the condition given by Formula 135 immediately before recording:

$$H_{C2} + \frac{\sigma_w}{2M_{S2}t_2} < |H_{ini.}| < H_{C1} + \frac{\sigma_w}{2M_{S1}t_1} \quad \text{Formula 135}$$

At this time, the first layer is left in the recorded state (Condition 1a or 1b in FIGS. 27 and 28). Condition 1a or 1b is maintained immediately before recording.

The bias field Hb is applied in the "non-A direction" ↓.

When a medium has a disk-like shape, a condition for preventing the previously recorded mark (in particular, a mark in which the first layer is in Condition 1a opposite to Hb) from being reversed by Hb when it approaches an Hb apply means is represented by Formula 135-2:

$$Hb < H_{C1} - \frac{\sigma_w}{2M_{S1}t_1} \quad \text{Formula 135-2}$$

The disk-like medium must satisfy this formula at the room temperature. A condition for preventing the initialized second layer from being reversed by Hb when it approaches the Hb apply means is represented by Condition 135-3:

$$Hb < H_{C2} - \frac{\sigma_w}{2M_{S2}t_2} \quad \text{Formula 135-3}$$

In other words, conditions for determining Hb are Formulas 135-2 and 135-3.

The mark in Condition 1a or 1b then reaches the spot region of the laser beam. The laser beam intensity includes two levels, i.e., high and low levels like in the basic invention.

A low-temperature cycle will be described below with reference to FIG. 27.

LOW-TEMPERATURE CYCLE

Upon radiation of a low-level laser beam, a medium temperature reaches $T_L$. Thus the following relation is established:

$$\sigma_w > E_1 \pm 2M_{S1} \cdot Hb \cdot t_1$$

(where if Hini is assumed to be positive, ± is "+" when $T_{comp.1} < T_L$, and is "−" when $T_{comp.1} > T_L$)

Under the presence of Hb ↓, (1) in Condition 1a with a magnetic wall, the direction of magnetization of the first layer is reversed, and the magnetic wall disappears, or (2) Condition 1b without a magnetic wall is maintained.

When the mark falls outside the spot region of the laser beam in this state, the medium temperature begins to decrease, and Condition $2_L$ in FIG. 27 is established, thus completing formation of a mark in the "non-A direction"↓.

The high-temperature cycle will be described below with reference to FIG. 28.

HIGH-TEMPERATURE CYCLE

Upon radiation of a high-level laser beam, the medium temperature is increased beyond $T_{comp.1} \approx T_L$. As a result, a condition without a magnetic wall is established.

The beam radiation continues and the medium temperature is further increased up to $T_H$. Since $T_H$ is close to the Curie temperatures of the first and second layers, the coersivities of the two layers are decreased. As a result, the medium satisfies one of the following Formulas (1) to (3):

$$|H_{C1} - H_{C2}| < \frac{\sigma_w}{2M_{S1}t_1} + \frac{\sigma_w}{2M_{S2}t_2} \quad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \quad (2)$$

and $$Hb > H_{C2} - \frac{\sigma_w}{2M_{S2}t_2}$$

$$Hb > H_{C1} - \frac{\sigma_w}{2M_{S1}t_1} \quad (3)$$

and $$Hb > H_{C2} + \frac{\sigma_w}{2M_{S2}t_2}$$

For this reason, the directions of magnetization of the two layers are almost simultaneously reversed to follow the direction of Hb. This condition corresponds to Condition $2_H$ in FIG. 28.

When the mark falls outside the spot region of the laser beam in Condition $2_H$, the medium temperature is begins to decrease.

When the medium temperature is decreased below $T_{comp.1}$, the medium type is restored from P type to original A type. The relationship between the strengths of TM and RE spins of the first layer is reversed (↑⇣ → ↑⇡). As a result, the direction of magnetization of the first layer is reversed to the "A direction" ↑ (Condition $3_H$ in FIG. 28).

The medium temperature is then decreased from the temperature in Condition $3_H$ to the room temperature. Since $H_{C1}$ at the room temperature is sufficiently high to satisfy the following Formula 135-4, the magnetization of the first layer is held in Condition $3_H$:

$$Hb < H_{C1} + \frac{\sigma_w}{2M_{S1}t_1} \quad \text{Formula 135-4}$$

In this manner, a mark in the "A direction" ↑ is formed in the first layer.

BRIEF DESCRIPTION OF THE DRAWINGS:

FIGS. 31 and 32 are graphs showing differences in various characteristics between a medium according to an embodiment of the present invention, and a medium according to a comparative example.

Figure 1:
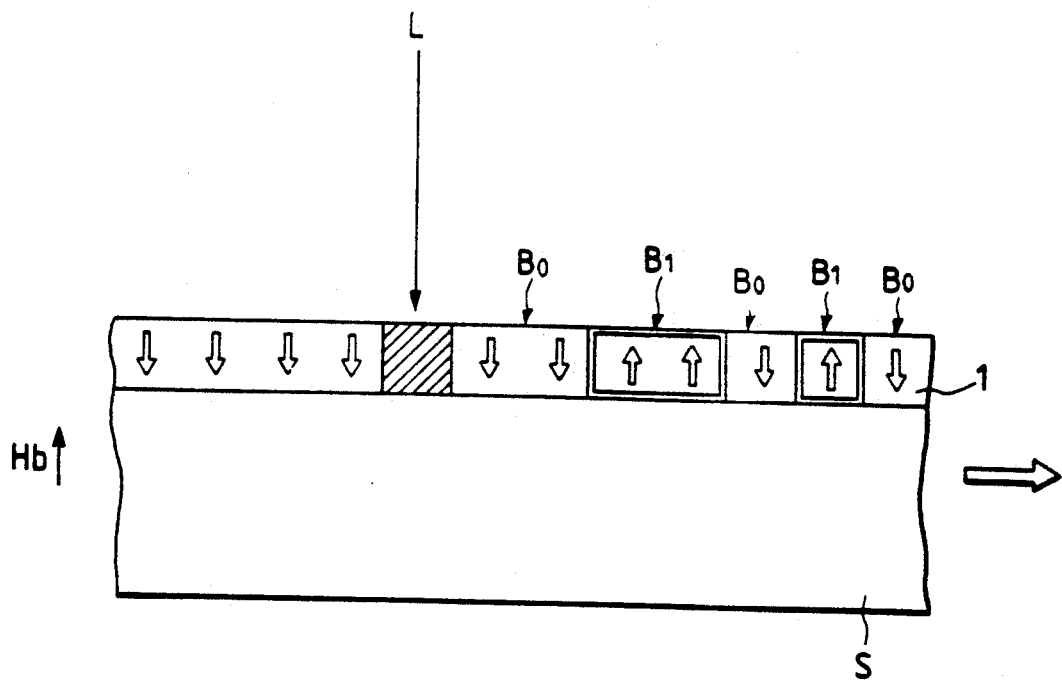
FIG. 1 is a schematic view for explaining a recording principle of a magnetooptical recording method.
Figure 2:
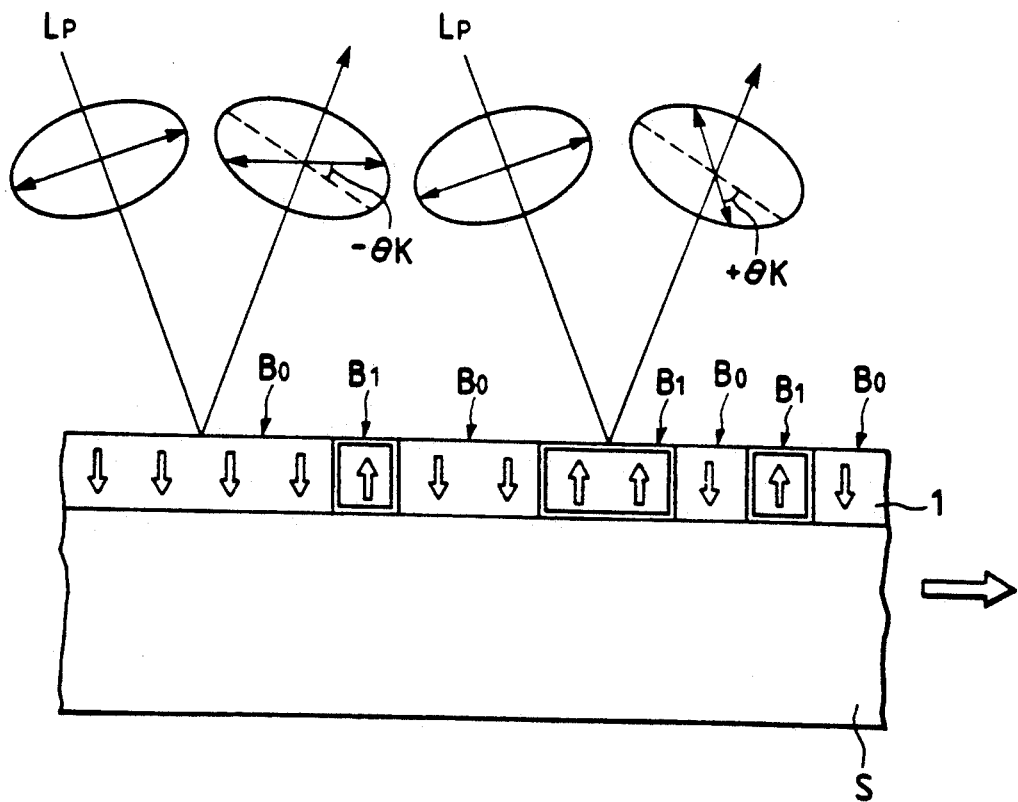
FIG. 2 is a schematic view for explaining a reproduction principle of the magnetooptical recording method.
Figure 3A:
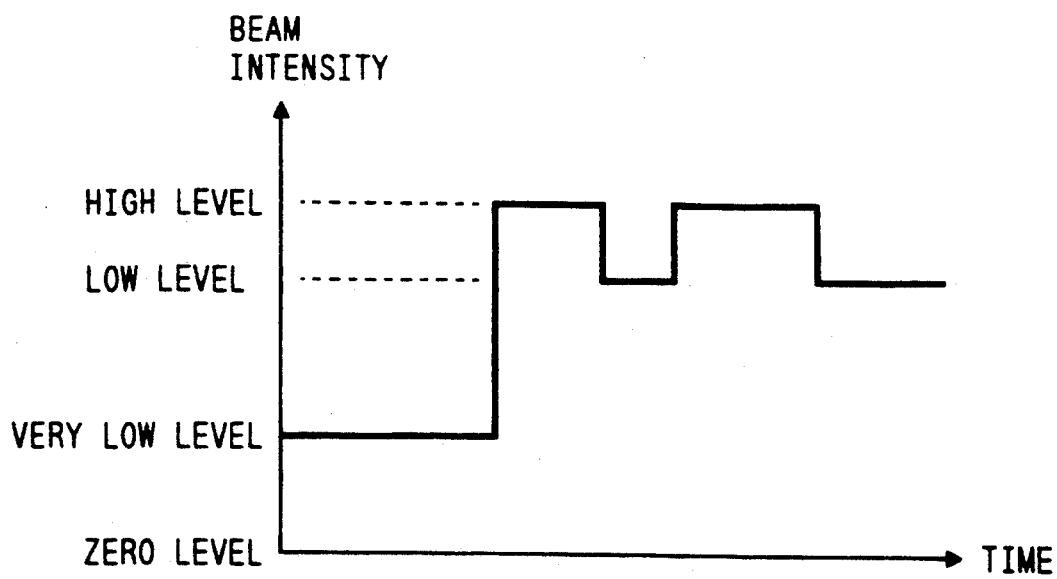
FIGS. 3A and 3B are charts showing an output waveform of a laser beam.
Figure 3B:
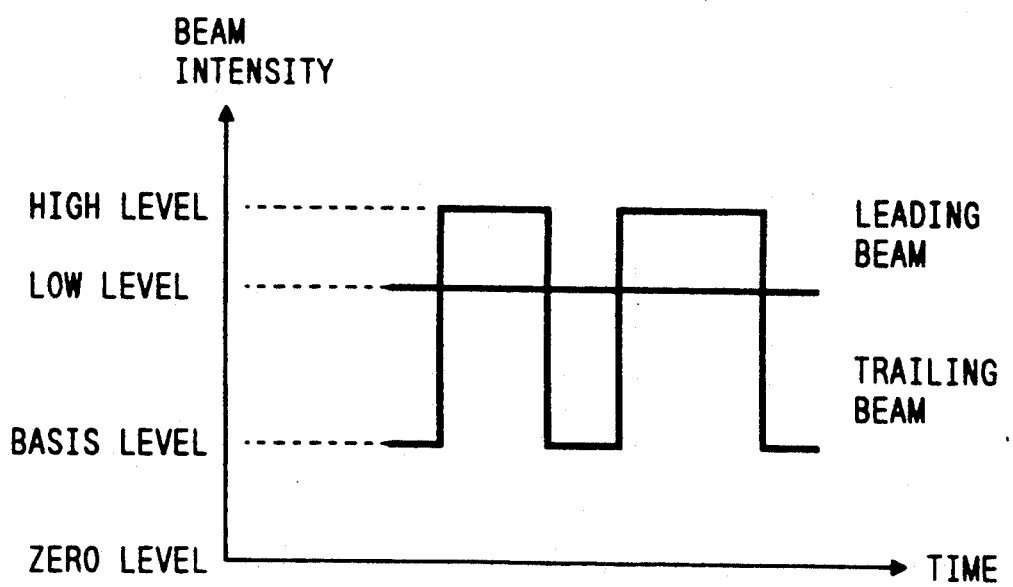
Figures 4A, 4B, 5:
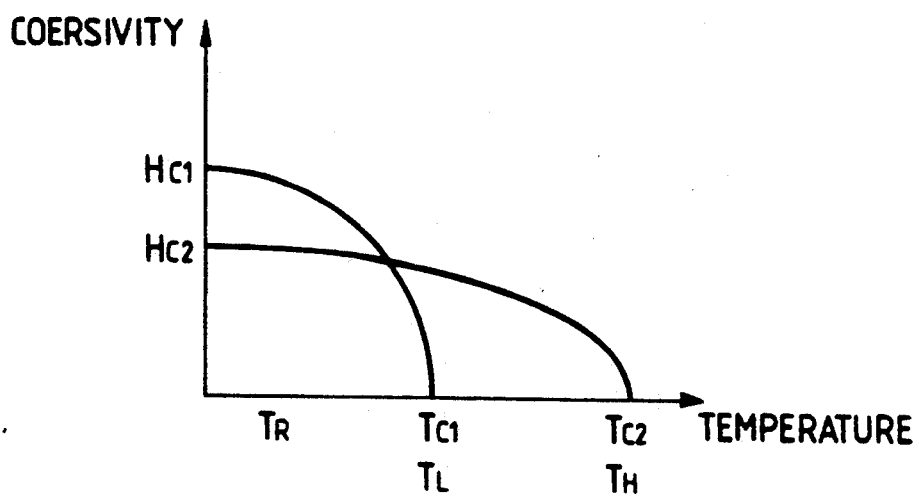
FIG. 4A is a diagram showing a multilayered structure of a recording medium.
FIG. 4B is a diagram showing directions of magnetization of first and second layers of the medium.
FIG. 5 is a graph showing the relationship between a temperature and a coersivity.
Figure 6:
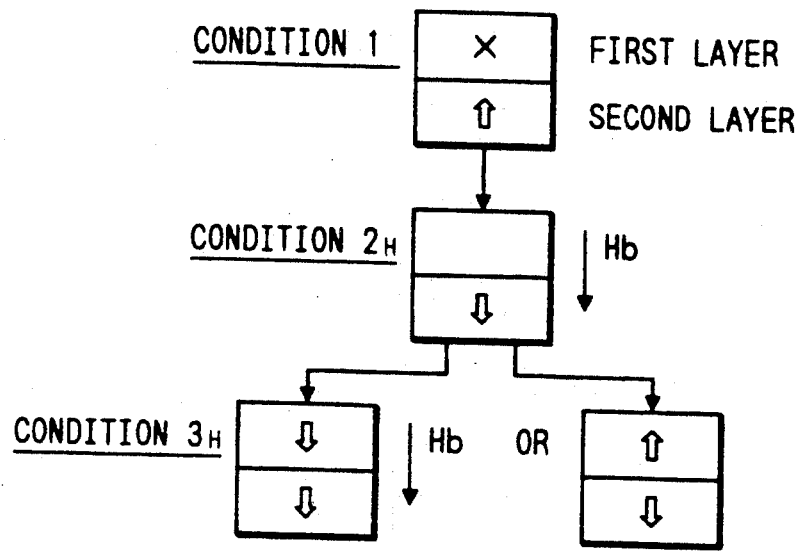
FIG. 6 is a diagram showing a change in direction of magnetization at high level in the first category of the basic invention.
Figure 7:
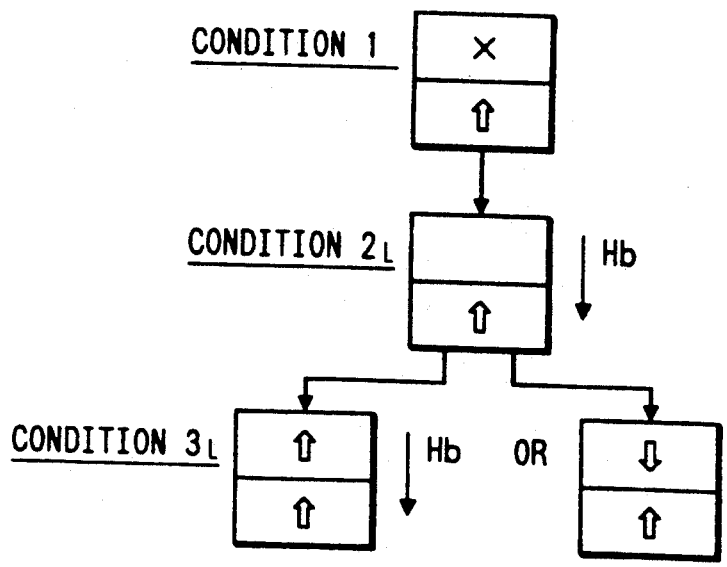
FIG. 7 is a diagram showing a change in direction of magnetization at low level in the first category of the basic invention.
Figure 8:
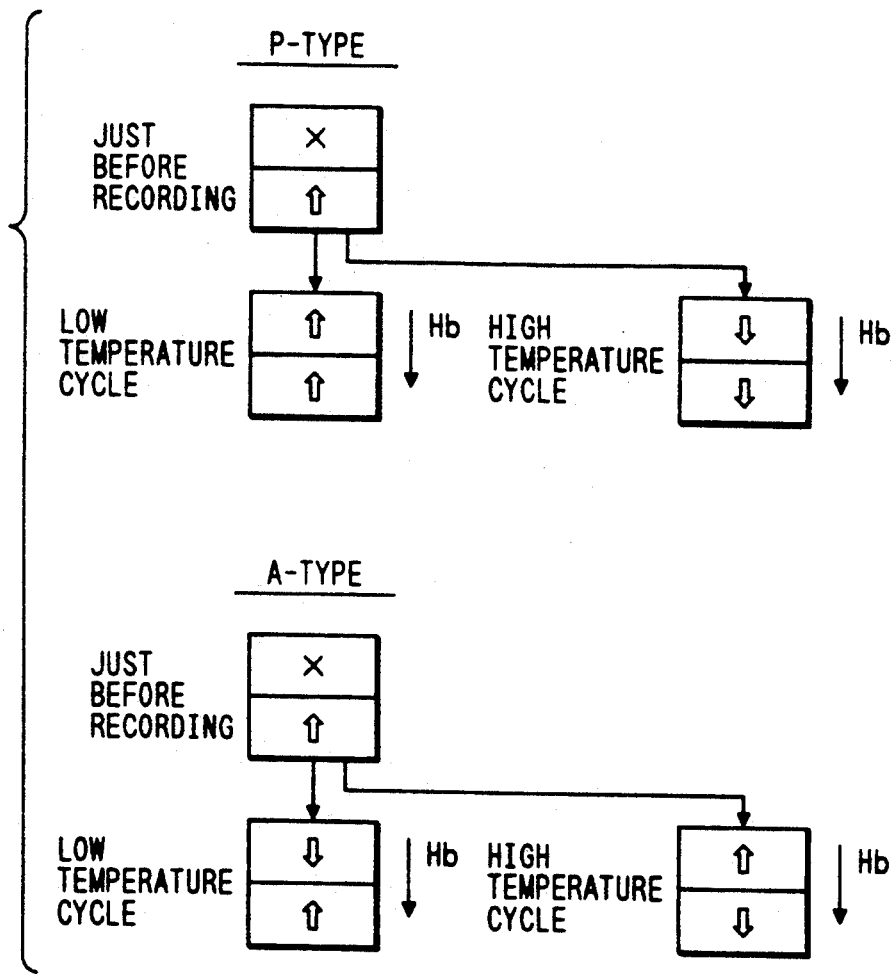
FIG. 8 is a diagram showing changes in direction of magnetization shown in FIGS. 6 and 7 in units of P and A type media.
Figure 9:
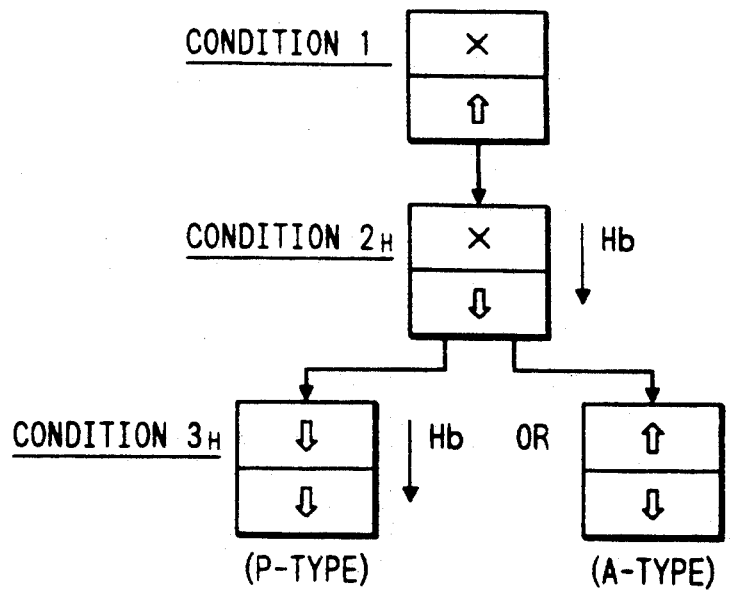
FIG. 9 is a diagram showing a change in direction of magnetization at high level in the second category of the basic invention.
Figure 10:
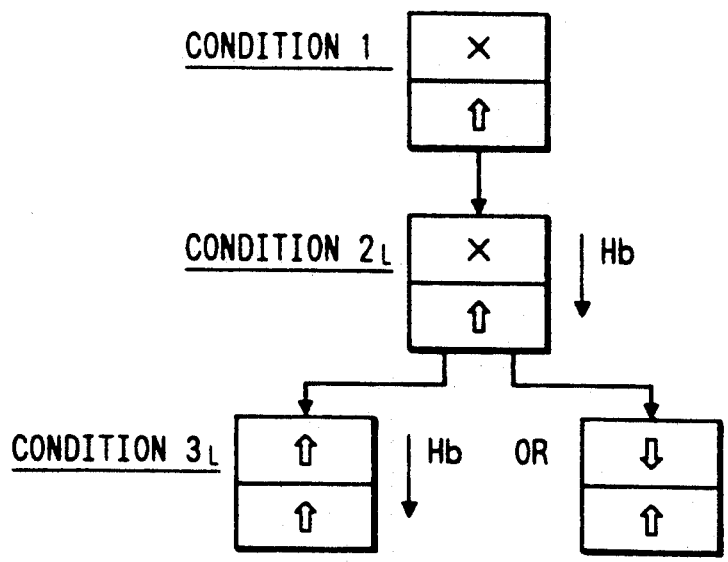
FIG. 10 is a diagram showing a change in direction of magnetization at low level in the second category of the basic invention.
Figure 11:
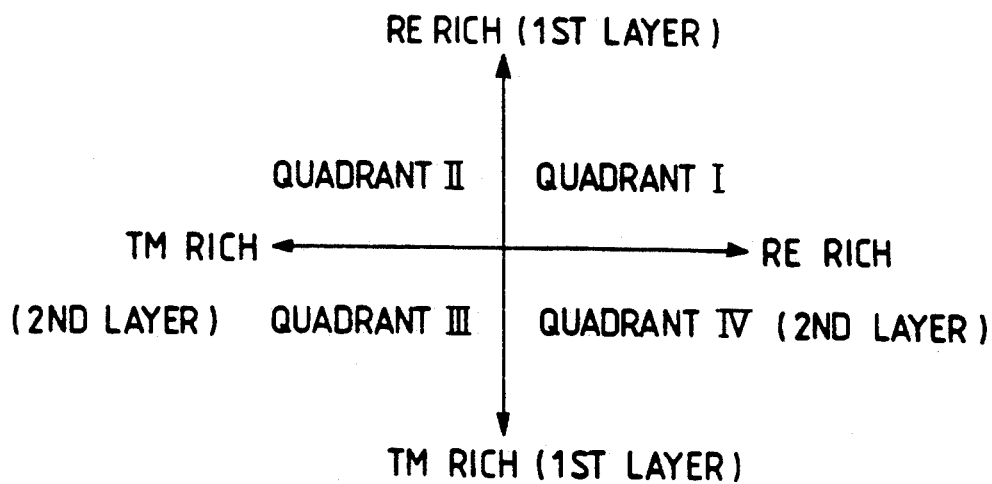
FIG. 11 is a map showing four types of media.
Figure 12A:
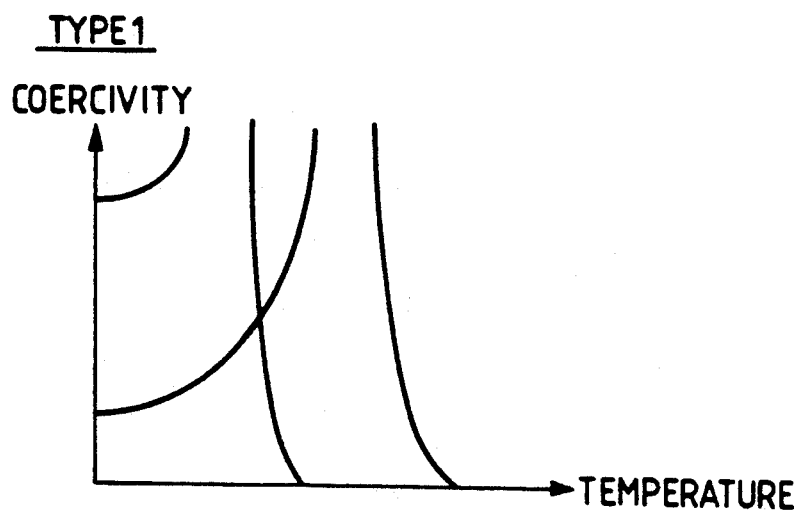
FIGS. 12A to 12D are graphs showing the relationships between temperatures and coersivities for Type I to Type IV media, respectively.
Figure 12B:
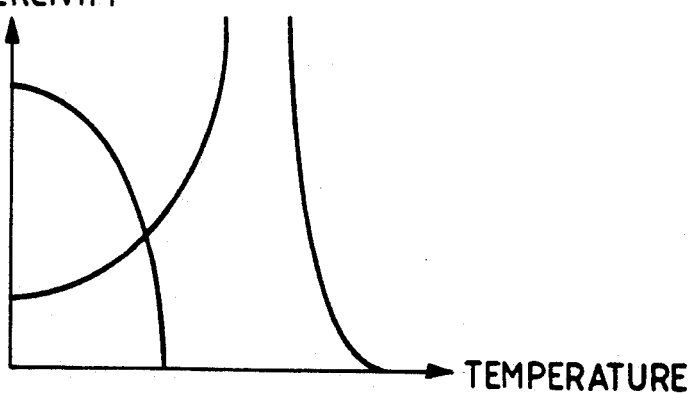
Figure 12C:
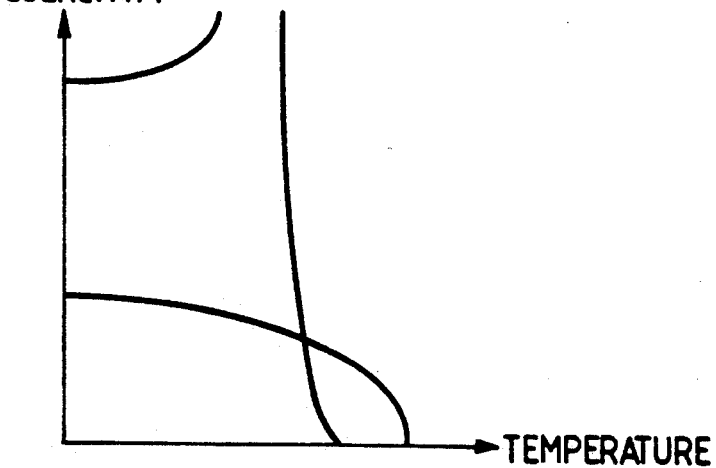
Figure 12D:
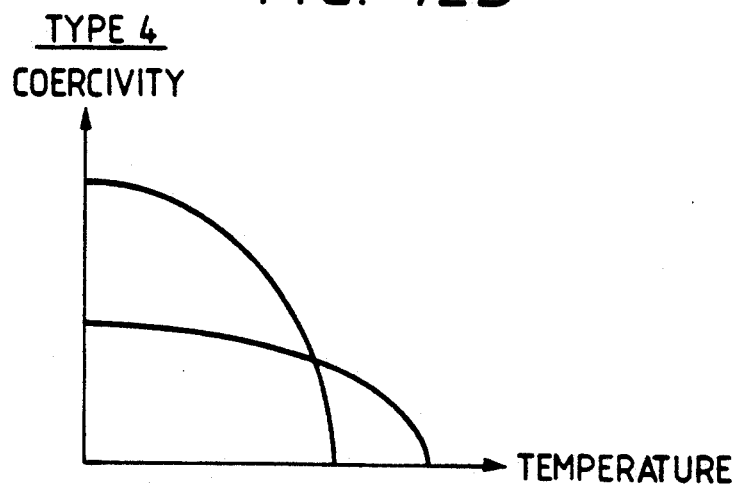
Figure 13:
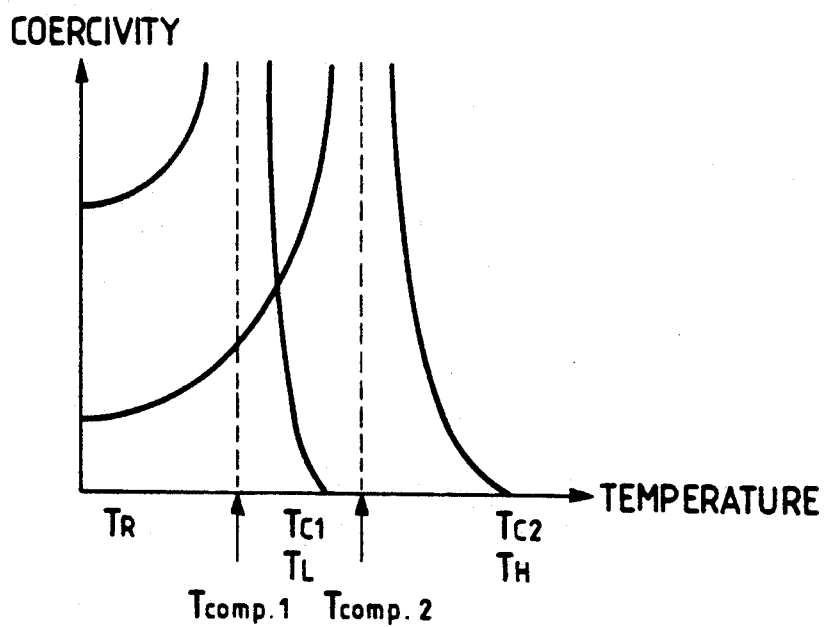
FIG. 13 is a graph showing the relationship between a temperature and a coersivity for a medium No. 1-1.
Figure 14:
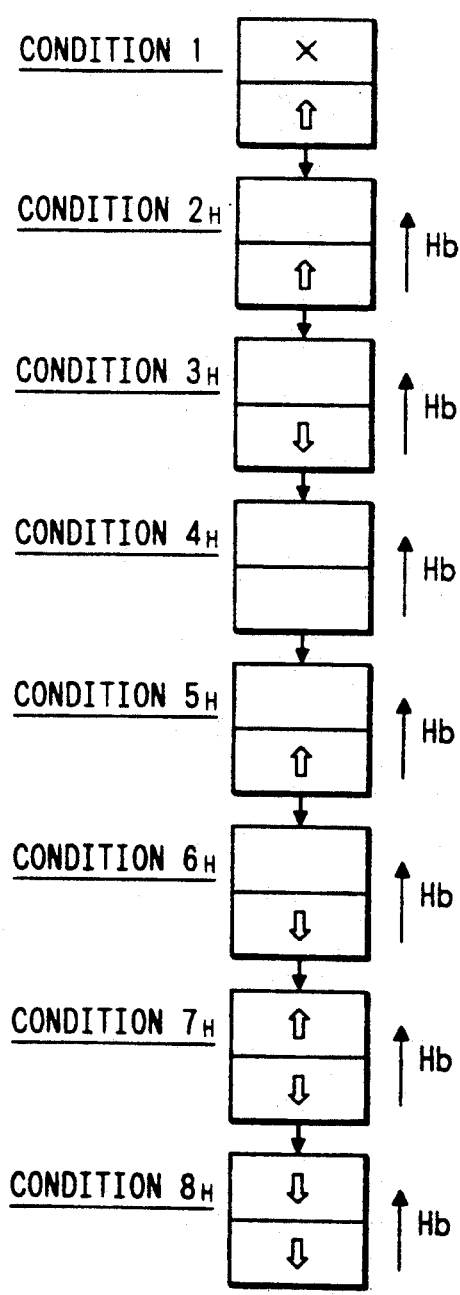
FIGS. 14 and 15 are diagrams showing changes in direction of magnetization in high- an low-temperature cycles of the medium No. 1-1.
Figure 15:
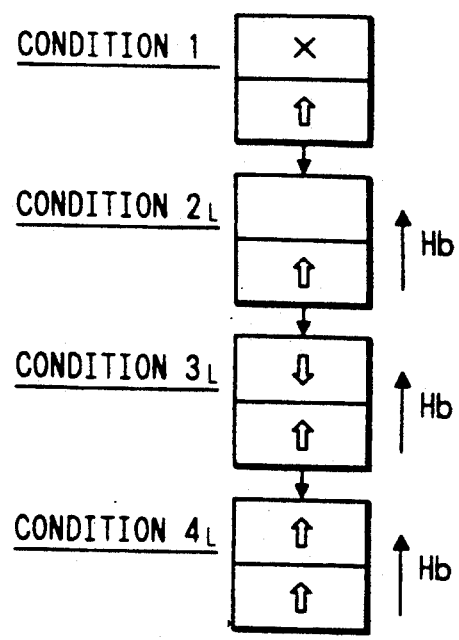
Figure 16:
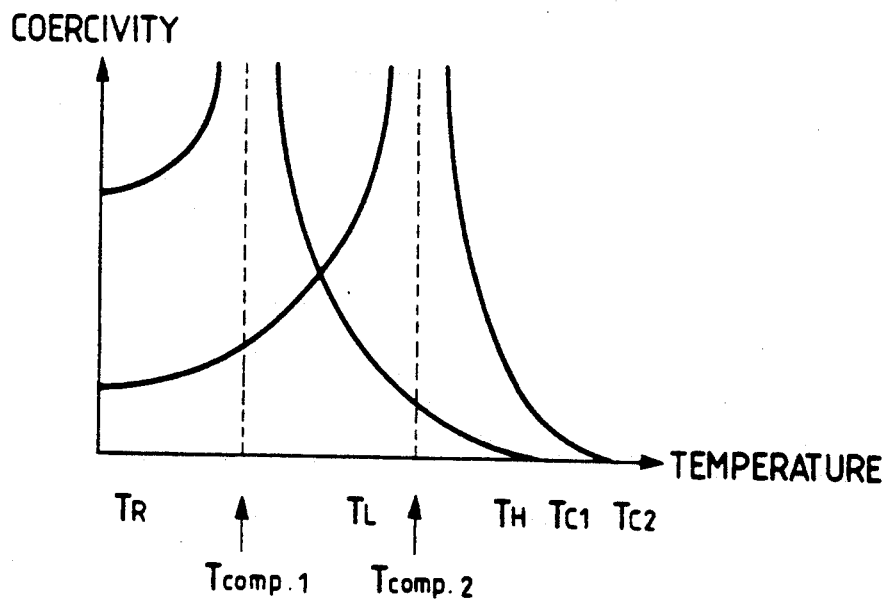
FIG. 16 is a graph showing the relationship between a temperature and a coersivity for a medium No. 1-2.
Figure 17:
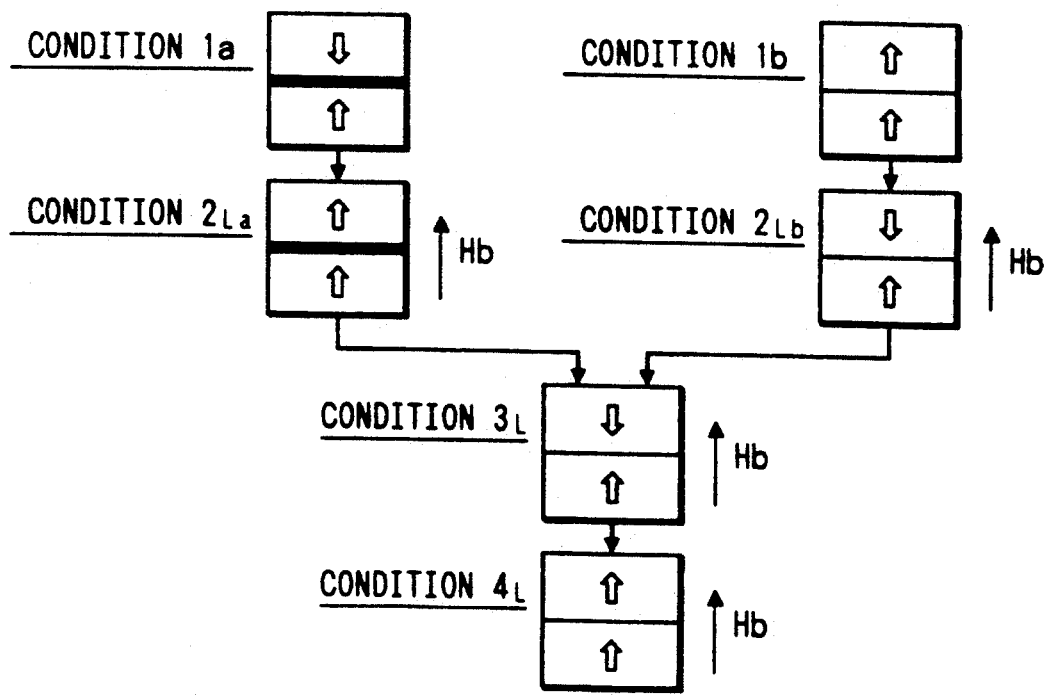
FIGS. 17 and 18 are diagrams showing changes in direction of magnetization in high- and low-temperature cycles of the medium No. 1-2.
Figure 18:
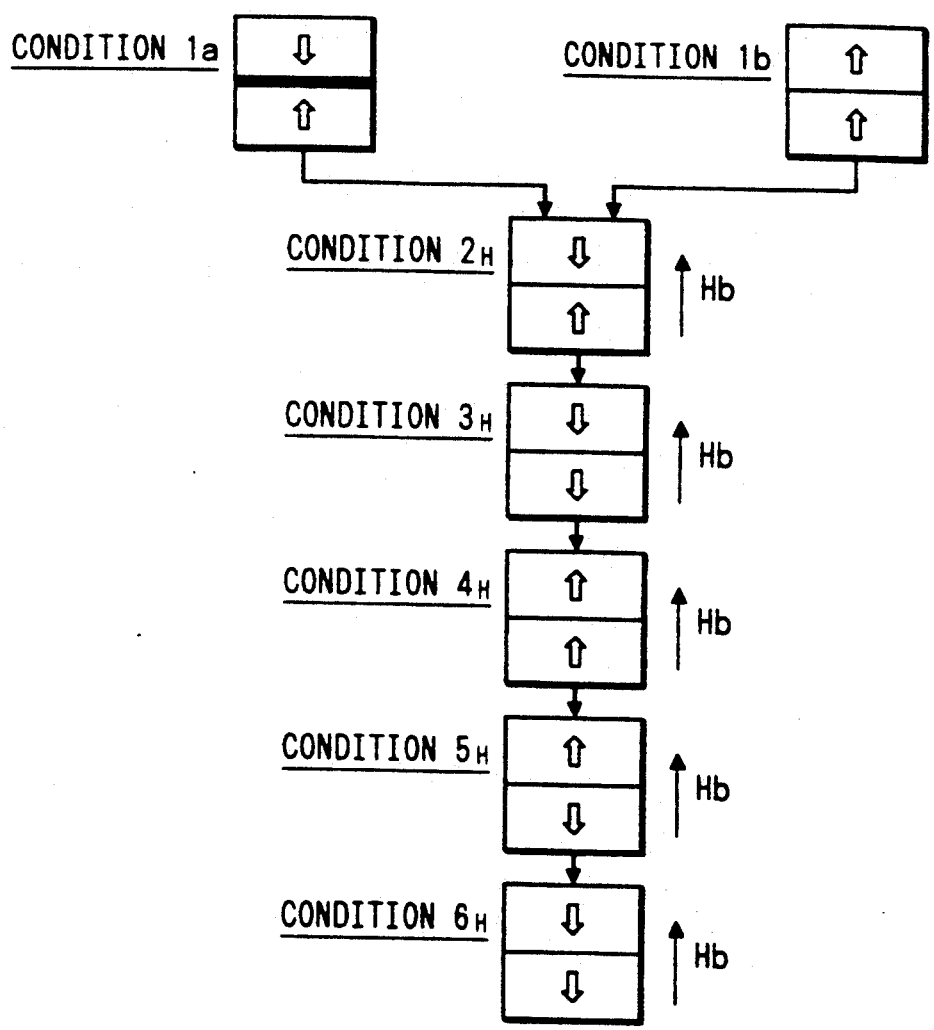
Figure 19:
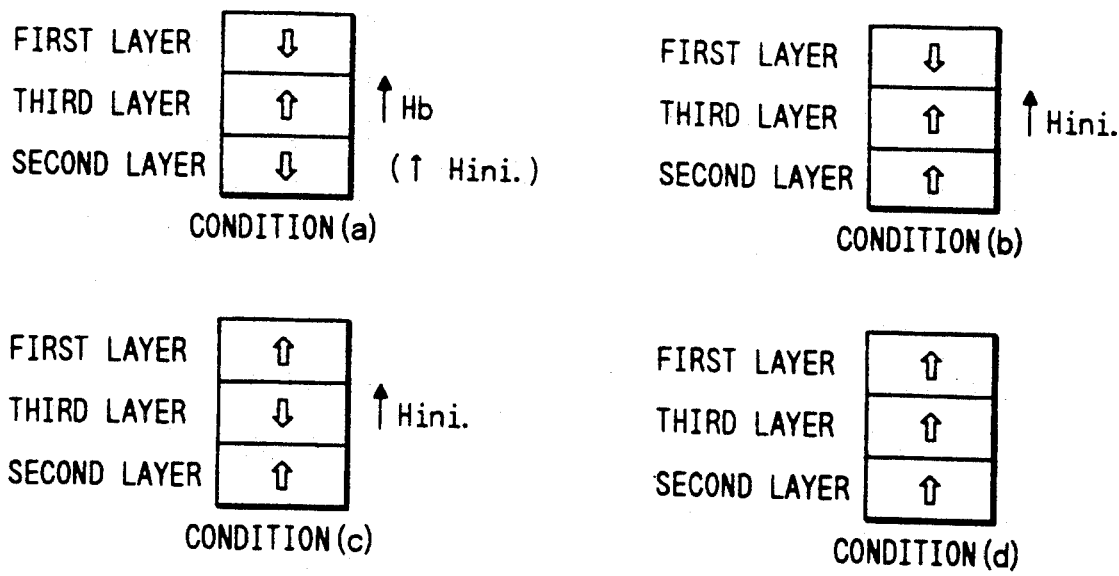
FIG. 19 is a diagram showing conditions with various directions of magnetization of a medium according to the first aspect of the present invention.
Figure 20:
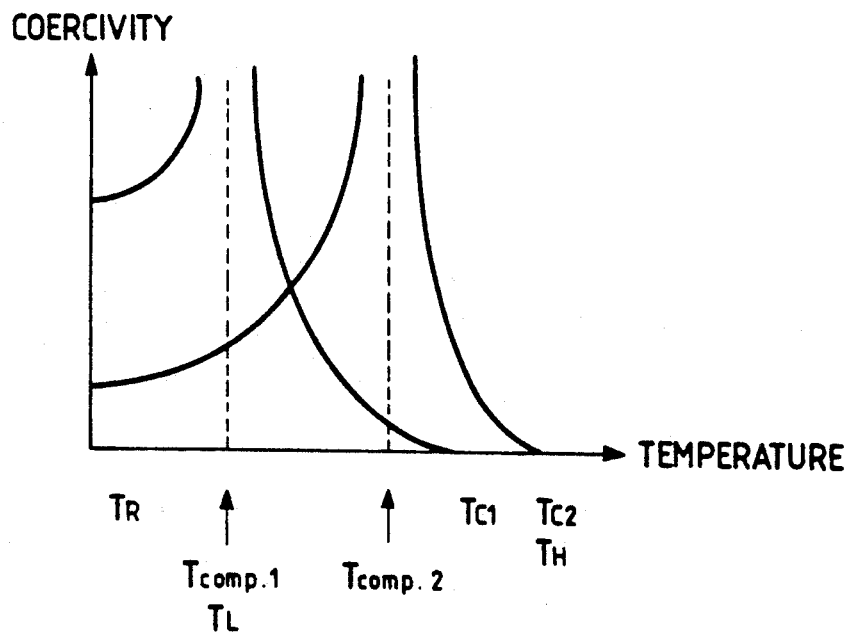
FIG. 20 is a graph showing the relationship between a temperature and a coersivity for a medium No. 1-3 according to the second aspect of the present invention.
Figure 21:
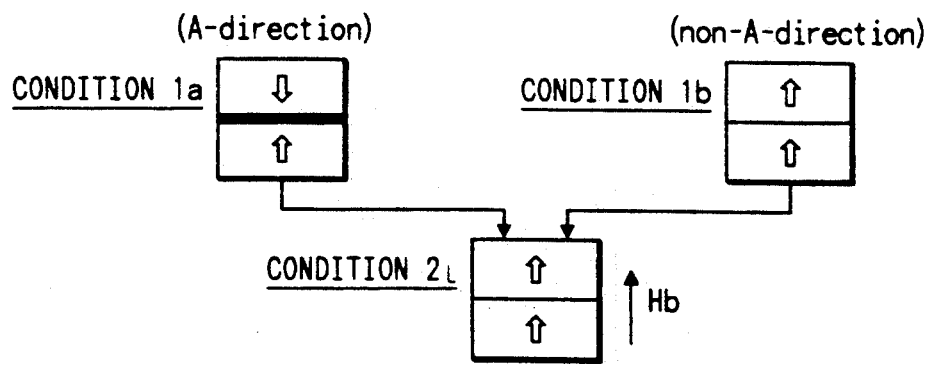
FIGS. 21 and 22 are diagrams showing changes in direction of magnetization in high- and low-temperature cycles of the medium No. 1-3.
Figure 22:
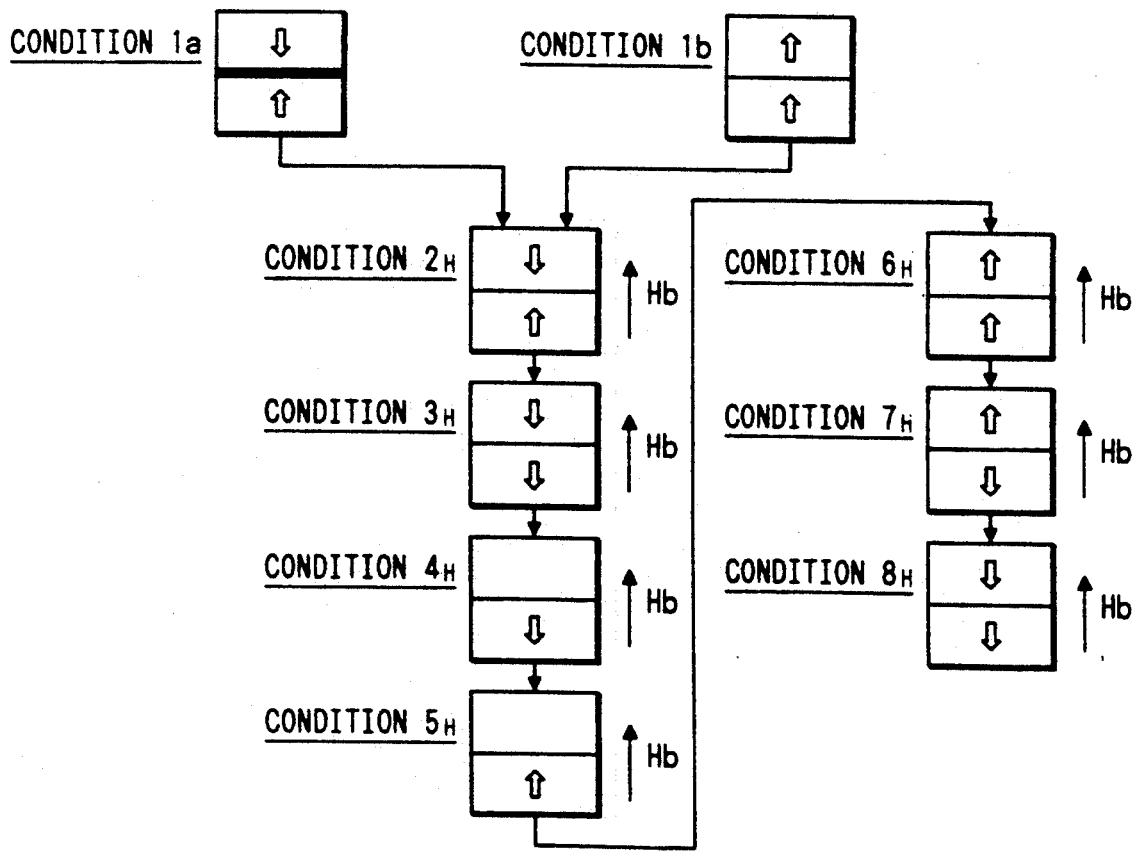
Figure 23:
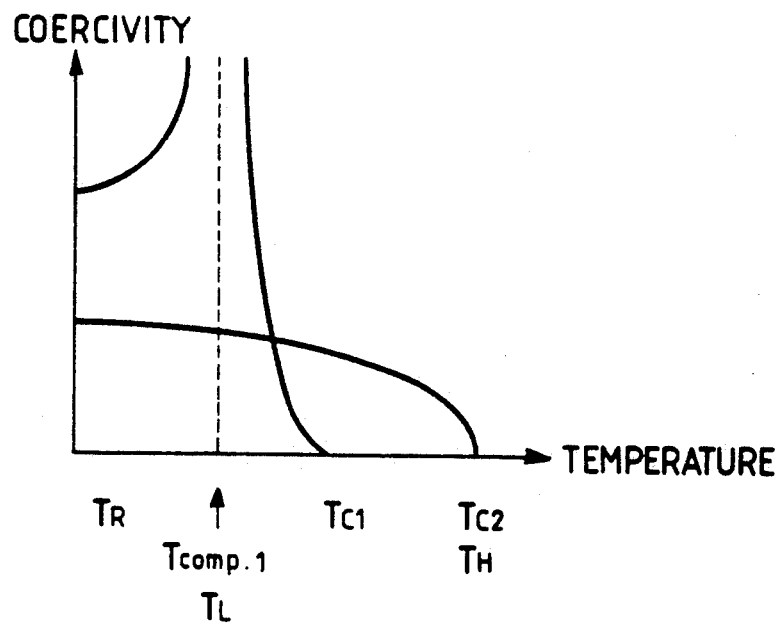
FIG. 23 is a graph showing the relationship between a temperature and a coersivity for a medium No. 3 according to the second aspect of the present invention.
Figure 24:
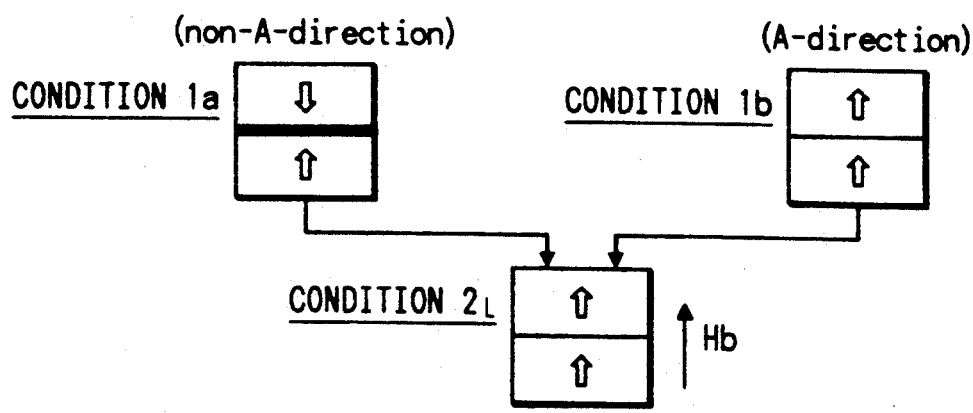
FIGS. 24 and 25 are diagrams showing changes in direction of magnetization in high- and low-temperature cycles of the medium No. 3.
Figure 25:
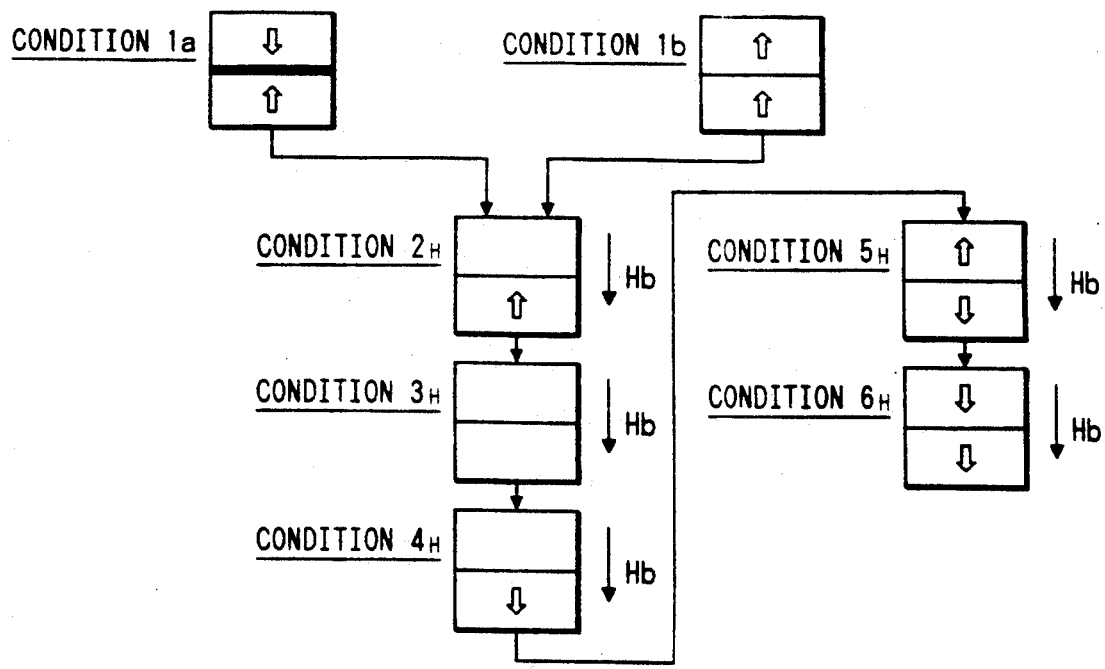
Figure 26:
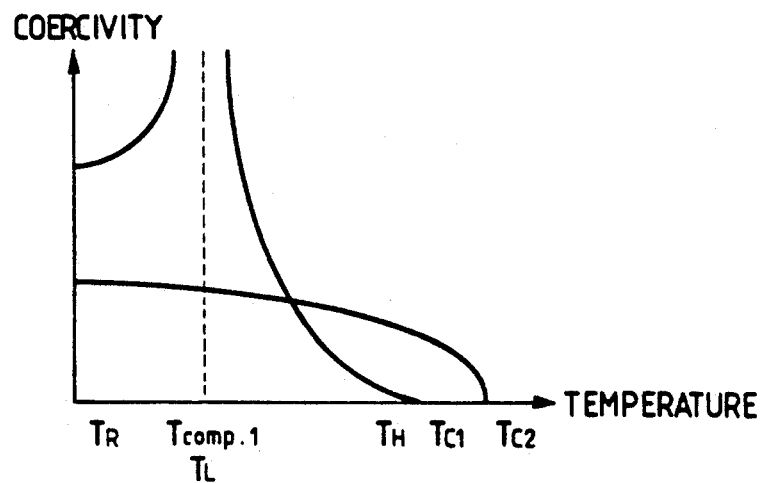
FIG. 26 is a graph showing the relationship between a temperature and a coersivity for a medium No. 5 according to the second aspect of the present invention.
Figure 27:
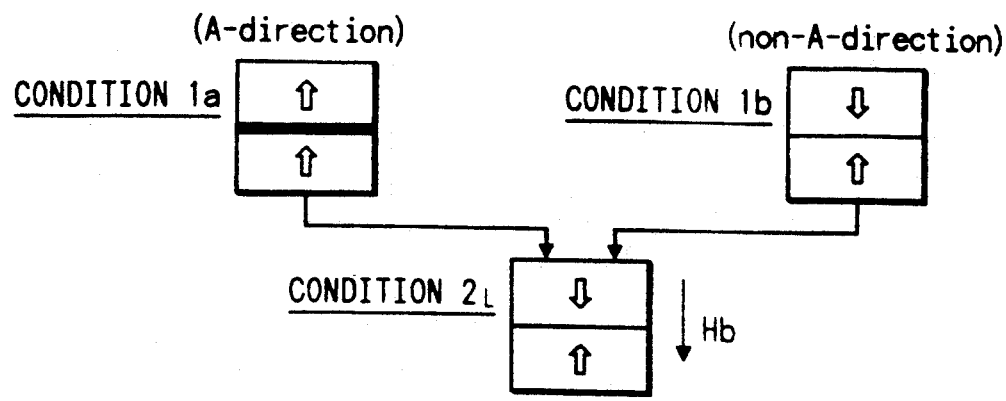
FIGS. 27 and 28 are diagrams showing changes in direction of magnetization in high- and low-temperature cycles of the medium No. 5.
Figure 28:
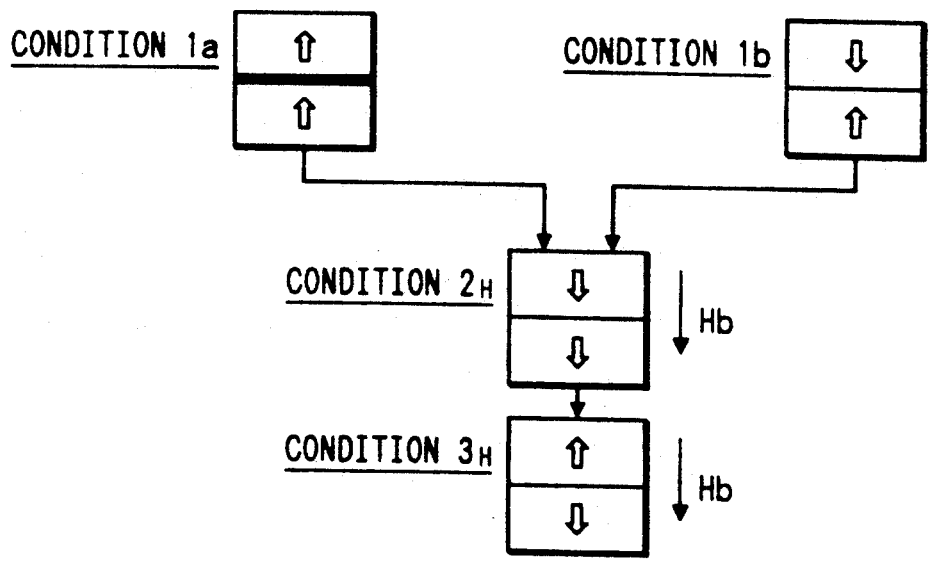
Figure 29:
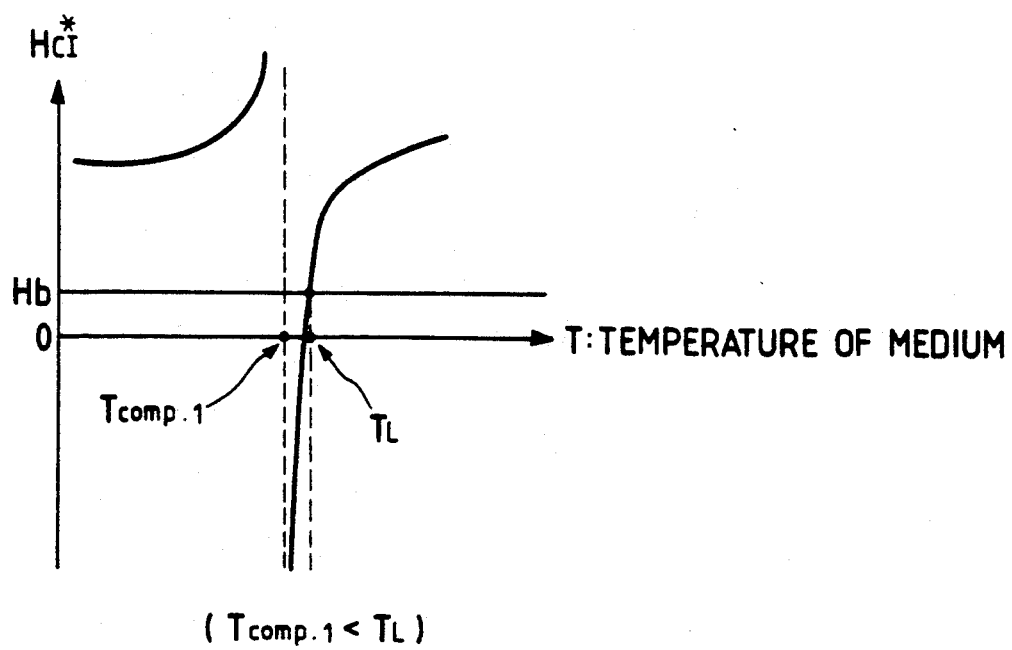
FIGS. 29 and 30 are graphs showing temperature characteristics of $H_{C1}^*$ of the media according to the second aspect of the present invention.
Figure 30:
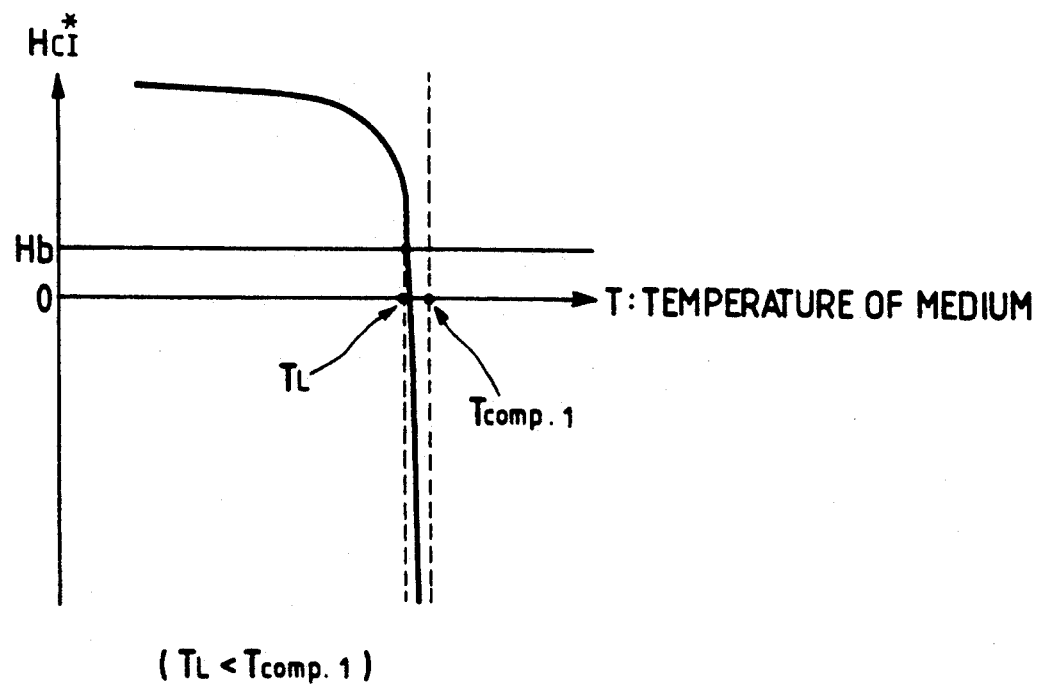

DETAILED DESCRIPTION OF THE PREFERRED EMBODIMENTS:

An embodiment of the present invention will be described in detail below. However, the present invention is not limited to this embodiment.

EMBODIMENT 1 (ACCORDING TO FIRST ASPECT) ... CLASS 1

A three-element RF magnetron sputtering apparatus is used, and a TbFeCo alloy is used as a target. A glass substrate having a thickness of 1.2 mm and a diameter of 200 mm is set in a chamber of the apparatus.

After the interior of the chamber of the apparatus is temporarily evacuated to $7 \times 10^{-7}$ Torr or less, Ar gas is introduced to $5 \times 10^{-3}$ Torr. Sputtering is then performed at a deposition rate of about 2 Å/sec.

In this manner, a first layer (recording layer) comprising a $Tb_{23}Fe_{71}Co_6$ (the unit of suffixes is atomic %; the same applies to the following description) perpendicular magnetic film having a thickness $t_1 = 500$ Å is formed on the substrate.

Then, the target is replaced with a GdDyFeCo alloy while maintaining the vacuum state, and sputtering is similarly executed, thereby forming a third layer comprising a $Gd_{10}Dy_8Fe_{71}Co_{11}$ perpendicular magnetic film having a thickness $t_3 = 300$ Å on the first layer.

Furthermore, the target is replaced with a TbDyFeCo alloy while maintaining the vacuum state, and sputtering is similarly executed, thus forming a second layer comprising a $Tb_5Dy_{23}Fe_{50}Co_{22}$ perpendicular magnetic film having a thickness $t_2 = 1,000$ Å on the third layer.

In this manner, a three-layered magnetooptical recording medium belonging to Class 1 (P Type, Quadrant I, Type 1) is manufactured.

Table 2 below summarizes manufacturing conditions and characteristics of this medium. Values of $M_S$, $H_C$, and $\sigma_w$ (unit: erg/cm$^2$) were obtained at 25° C.

TABLE 2

|  | First Layer | Third layer | Second Layer |
|---|---|---|---|
| Film Thickness (Å) | 500 | 300 | 1,000 |
| $M_S$ (emu/cc) | 45 | 80 | 160 |
| $H_C$ (Oe) | 15,000 | 1,000 | 1,500 |
| $T_C$ (°C.) | 190 | 250 | 310 |
| $T_{comp.}$ (°C.) | 75 | none | 150 |
| $\sigma_w$ | $\sigma_{w1} = 4.0$ |  | $\sigma_{w2} = 3.5$ |

COMPARATIVE EXAMPLE ... CLASS 1

A two-layered film medium was manufactured following the same procedures as in Embodiment 1 without forming the third layer. An exchange coupling force between the first and second layers in this medium was 4.0.

Margins for Hini. in Embodiment 1 and Comparative Example will be examined below.

Since the medium of Embodiment 1 satisfies $M_{S1}t_1 < M_{S3}t_3$, Formula 105 for enabling Condition (b) but disabling Condition (d) is calculated.

Thus, the value of the left-hand side of Formula 105 is about 2,600 Oe, and the value of the right-hand side is about 23,900 Oe. Therefore, Hini. can be selected from a range of 2,600 to 23,900.

In contrast to this, Formula 103 is calculated for the medium of Comparative Example. As a result, Hini. can only be selected from a range of 2,750 to 6,110.

Therefore, the margin for Hini. of Embodiment 1 is larger by about 6 times than that of Comparative Example as follows:

$$(23,900 - 2,600) \div (6,110 - 2,750) \approx 6$$

EMBODIMENT 2 (ACCORDING TO FIRST ASPECT) ... CLASS 1

After the first layer of Embodiment 1 is formed, a $Gd_{15}Dy_{6.5}Fe_{71}Co_{7.5}$ perpendicular magnetic film (third layer) having a film thickness $t_3 = 300$ Å is formed following the same procedures as in Embodiment 1, and the same second layer as in Embodiment 1 is formed thereon.

In this manner, a three-layered magnetooptical recording medium belonging to Class 1 (P type, Quadrant I, Type 1) is manufactured.

TABLE 3

|  | First Layer | Third layer | Second Layer |
|---|---|---|---|
| Film Thickness (Å) | 500 | 300 | 1,000 |
| $M_S$ (emu/cc) | 45 | 50 | 160 |
| $H_C$ (Oe) | 15,000 | 300 | 1,500 |
| $T_C$ (°C.) | 190 | 250 | 310 |
| $T_{comp.}$ (°C.) | 75 | none | 150 |
| $\sigma_w$ | $\sigma_{w1} = 4.0$ | | $\sigma_{w2} = 3.5$ |

Margins for Hini. in Embodiment 2 and Comparative Example (corresponding to the medium of Embodiment 2 excluding the third layer) will be examined below.

Since the medium of Embodiment 2 satisfies $M_{S1}t_1 > M_{S3}t_3$, and $$\frac{\alpha}{\beta} - \frac{\sigma_{w2}}{2\beta_{S2}t_2} < H_{C1} + \frac{\sigma_{w1}}{2M_{S1}t_1}$$

(where $\alpha = M_{S1}t_1 H_{C1} + M_{S3}t_3 H_{C3}$, $\beta = M_{S1}t_1 - M_{S3}t_3$) then, Formula 104 for enabling Condition (b) but disabling Condition (c) is calculated.

Thus, the value of the left-hand side of Formula 104 is about 2,600 Oe, and the value of the right-hand side is about 22,300 Oe. Therefore, Hini. can be selected from a range of 2,600 to 22,300.

In contrast to this, Formula 103 is calculated for the medium of Comparative example. As a result, Hini. can only be selected from a range of 2,750 to 6,110.

Therefore, the margin for Hini. of Embodiment 2 is larger by about 6 times than that of Comparative Example as follows:

$(22,300 - 2,600) \div (6,110 - 2,750) \approx 6$

EMBODIMENT 3 (ACCORDING TO SECOND ASPECT) ... CLASS 1

A three-element RF magnetron sputtering apparatus is used, and two alloys, i.e., a TbFeCo alloy and a DyTbFeCo alloy are placed as targets. A glass substrate having a thickness of 1.2 mm and a diameter of 200 mm is set in a chamber of the apparatus.

After the interior of the chamber of the apparatus is temporarily evacuated to $7 \times 10^{-7}$ Torr or less, Ar gas is introduced to $5 \times 10^{-3}$ Torr. Sputtering is then performed at a deposition rate of about 2 Å/sec.

A first layer (recording layer) comprising a $Tb_{26.3}Fe_{70}Co_{3.7}$ (the unit of suffixes is atomic %; the same applies to the following description) perpendicular magnetic film having a thickness $t_1 = 500$ Å is formed on the substrate using the TbFeCo alloy as the target.

The target is replaced with the GdTbFeCo alloy while maintaining the vacuum state, and sputtering is similarly performed, thereby forming a second layer (recording layer) comprising a 1,700-Å thick $Dy_{19}Tb_9Fe_{42}Co_{30}$ perpendicular magnetic film on the first layer.

In this manner, a two-layered magnetooptical recording medium No. 1 belonging to Class 1 (P Type, Quadrant I, Type 1) is manufactured.

Table 4 below summarizes manufacturing conditions and characteristics of this medium. Values of $M_S$, $H_C$, and $\sigma_w$ were obtained at 25° C.

TABLE 4

|  | First Layer | Second Layer |
|---|---|---|
| Composition (First Layer) | $Tb_{26.3}Fe_{70}Co_{3.7}$ | |
| Composition (Second Layer) | | $Dy_{19}Tb_9Fe_{42}Co_{30}$ |
| Film Thickness (Å) | 500 | 1,700 |
| $M_S$ (emu/cc) | 100 | 160 |
| $H_C$ (Oe) | 12,000 | 1,500 |
| $T_C$ (°C.) | 180 | 270 |
| $T_{comp.}$ (°C.) | 130 | 150 |
| $T_L$ (°C.) | 135 | |
| $\sigma_w$ | 4.2 (erg/cm²) | |
| $\eta$ | ≧ about 4,000 (Oe/°C.) | |

COMPARATIVE EXAMPLE 2 ... CLASS 8

A two-layered magnetooptical recording medium No. 8 belonging to Class 8 (A type, Quadrant IV, Type shown in Table 5 below is manufactured following the same procedures as in Embodiment 3.

In Table 5, values of $M_S$, $H_C$, and $\sigma_w$ were obtained at 25° C.

TABLE 5

|  | First Layer | Second Layer |
|---|---|---|
| Composition (First Layer) | $Tb_{23}Fe_{73}Co_4$ | |
| Composition (Second Layer) | | $Dy_{19}Tb_9Fe_{42}Co_{30}$ |
| Film Thickness (Å) | 500 | 1,500 |
| $M_S$ (emu/cc) | 100 | 160 |
| $H_C$ (Oe) | >20,000 | 1,500 |
| $T_C$ (°C.) | 180 | 270 |
| $T_{comp.}$ (°C.) | none | 140 |
| $T_L$ (°C.) | 135 | |
| $\sigma_w$ (room temperature) | 4.2 (erg/cm²) | |
| $\eta$ | < 200 (Oe/°C.) | |

TEST EXAMPLE 1

Each of the media of Embodiments and Comparative Example was rotated at a linear velocity $v = 5.65$ m/sec, and a bias field Hb was applied thereto while being increased by 100 Oe. At respective levels of Hb, (1) a minimum laser beam intensity necessary for completely erasing, in a low-temperature cycle, a "mark having a mark length of 0.75 μm" formed (recorded) in advance in a high-temperature cycle, and (2) a minimum laser beam intensity necessary for forming a mark in a high-temperature cycle after the mark was completely erased were measured.

Figure 31:
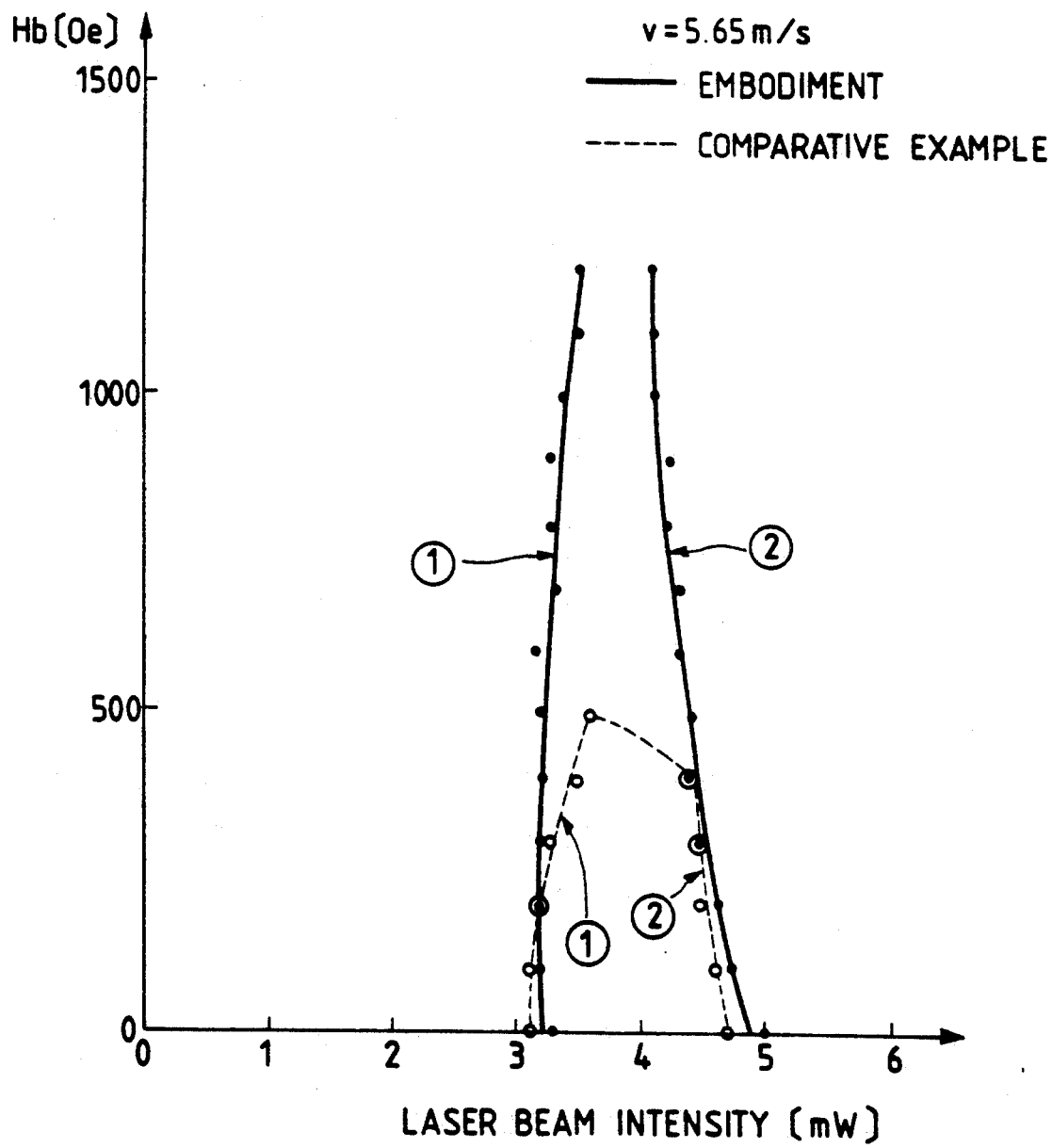

FIG. 31 shows the measurement results. In FIG. 31, ① represents the former measurement result, and ② represents the latter measurement result. As can be seen from FIG. 31, curves ① and ② do not intersect with each other, and hence, Hb of 1,200 Oe or higher can be assured, resulting in a large margin.

In contrast to this, as for the medium of Comparative Example (dotted curve), curves ① and ② intersect at Hb = 500 Oe, and hence, Hb must be set to be less than 500 Oe, resulting in a small margin.

TEST EXAMPLE 2

(1) "Marks each having a mark length of 0.75 μm" were intermittently formed on a predetermined track on each of media of Embodiments and Comparative example.

(2) Each medium was rotated at a linear velocity $v = 5.65$ m/sec, and a laser beam having an intensity of 1 mW was radiated on the "marks" under an application condition of the bias field Hb=300 Oe.

(3) For each medium, (1) "mark" formation (recording) and (2) radiation while increasing a laser beam intensity by 0.1 mW were repeated for each track while changing tracks.

(4) A reproduction laser beam was radiated on the "marks", and a C/N ratio was measured.

(5) FIG. 32 shows the measurement results. In FIG. 32, a medium of Embodiment (solid curve) has a constant C/N ratio of 47 dB when the laser beam intensity is low. However, the C/N ratio is immediately decreased after a given value Prs=2.2 mW, and becomes completely zero when Pce=3.2 mW. Therefore, a difference (Pce−Prs) between a beam intensity Pce for erasing the mark completely and a beam intensity Prs for starting erasing during reproduction is about 1.0 mW.

In contrast to this, as for a medium of Comparative Example (dotted curve), when a beam intensity is low, a C/N ratio is constant, i.e., 47 dB. However, the C/N ratio is immediately decreased after a given value Prs=2.0 mW, and becomes completely zero when Pce=3.2 mW. Therefore, (Pce−Prs) is 1.2 mW.

As can be understood from the above description, in a medium of Embodiment, there is no fear of erasing a mark (recorded information) even if a beam intensity is increased during reproduction, and hence, a C/N ratio can be increased.

If a margin is kept to assure safety, it is preferable to reproduce information with 1 to 1.5 mW. Thus, since a margin of 0.2 mW in this embodiment can be obtained, this means that a laser beam intensity during reproduction can be increased by about 10 to 20%. As a result, a C/N ratio can be expected to be increased by about 2 dB.

What is claimed is:

1. An over-write capable magneto-optical recording medium which has a multilayered structure consisting f a substrate, a first layer having a perpendicular magnetic anisotropy and serving as a recording layer, and a second layer having a perpendicular magnetic anisotropy and serving as a reference layer, and in which the direction of magnetization of only said second layer is aligned in one of upward and downward directions with respect to a layer surface by an initial field $H_{ini}$ immediately before recording while the direction of magnetization of said first layer is left unchanged, and a light beam which is pulse-modulated according to information to be recorded is radiated on said medium under the presence of a bias field to allow an over-write operation, wherein said first layer has a compensation temperature $T_{comp.1}$ between the room temperature and a Curie temperature $T_{C1}$, and wherein the following equations are met:

$$\eta = \frac{d}{dT} |H_{C1}^*|, \quad T \text{ being the medium temperature}$$

$$H_{C1}^* = H_{C1}(1 - \sigma_w)/E_1$$

$$E_1 = 2 \cdot M_{S1} \cdot H_{C1} \cdot t_1 \text{ erg/cm}^2$$

wherein $\eta$ is not less than 200 Oe/° C. at a temperature $T_L$ at which a low temperature process occurs $M_{S1}$: saturation magnetization in Gauss of the first layer $H_{C1}$: coercivity in Oe of the first layer $t_1$: film thickness in cm of the first layer $\sigma_w$: magnetic wall energy in erg/cm² which is generated or disappears upon reversal of the direction of magnetization of the first layer.

* * * * *